(12) United States Patent
Carlton et al.

(10) Patent No.: US 9,353,800 B2
(45) Date of Patent: *May 31, 2016

(54) OVERLOAD PROTECTION

(71) Applicant: FAIRFIELD MANUFACTURING COMPANY, INC., Lafayette, IN (US)

(72) Inventors: Kenneth E. Carlton, West Lafayette, IN (US); Dennis Buuck, Lafayette, IN (US)

(73) Assignee: FAIRFIELD MANUFACTURING COMPANY, INC., Layfayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,021

(22) Filed: Jul. 7, 2014

(65) Prior Publication Data

US 2014/0323262 A1    Oct. 30, 2014

Related U.S. Application Data

(63) Continuation of application No. 13/484,226, filed on May 30, 2012, now Pat. No. 8,808,133.

(51) Int. Cl.

| | |
|---|---|
| *F16H 57/08* | (2006.01) |
| *F16D 9/06* | (2006.01) |
| *F16H 35/10* | (2006.01) |
| *F16D 9/08* | (2006.01) |
| *F16H 1/28* | (2006.01) |

(52) U.S. Cl.
CPC .. *F16D 9/06* (2013.01); *F16D 9/08* (2013.01); *F16H 1/28* (2013.01); *F16H 35/10* (2013.01); *Y10T 74/19633* (2015.01)

(58) Field of Classification Search
None
See application file for complete search history.

(56) References Cited

U.S. PATENT DOCUMENTS

| | | | | |
|---|---|---|---|---|
| 2,964,931 | A | * | 12/1960 | Sorenson ................. 464/32 |
| 3,071,945 | A | * | 1/1963 | Shomo .................... 464/33 |
| 4,062,252 | A | | 12/1977 | Matikainen |
| 4,132,131 | A | | 1/1979 | DeBruyne |
| 4,252,034 | A | | 2/1981 | DeBruyne |
| 4,543,074 | A | * | 9/1985 | Ville et al. ............... 464/33 |
| 4,669,999 | A | * | 6/1987 | Miller .................... 464/10 |
| 4,856,379 | A | * | 8/1989 | Jafarey .................. 475/176 |
| 4,873,894 | A | | 10/1989 | Avery et al. |
| 4,932,280 | A | * | 6/1990 | Becker et al. ........... 74/665 G |
| 4,971,267 | A | * | 11/1990 | Fulton et al. ............ 244/99.9 |
| 5,779,587 | A | * | 7/1998 | Reilly .................... 475/263 |

(Continued)

FOREIGN PATENT DOCUMENTS

JP      59065646      4/1984

OTHER PUBLICATIONS

Phebus, Dan E. et al.; Roadheader Gearbox; Utility U.S. Appl. No. 13/484,089, filed May 30, 2012.

(Continued)

*Primary Examiner* — Dirk Wright
(74) *Attorney, Agent, or Firm* — Woodling, Krost and Rust

(57) ABSTRACT

An overload protection device in combination with a prime mover and gearbox transmission supplies torque through a gearbox transmission to a load. An input shaft with is driven by the prime mover and rotates therewith. An external spline on the input shaft mates with an input gear having an internal spline. Upon overload of the gearbox transmission, the input shaft fractures an annular groove in the input shaft. A bushing prevents travel of the portion of the input shaft which is driven by the prime mover and which continues to spin after the fracture.

8 Claims, 22 Drawing Sheets

(56) References Cited

U.S. PATENT DOCUMENTS

| | | |
|---|---|---|
| 6,676,560 B1 | 1/2004 | Buelna |
| 6,874,994 B2 | 4/2005 | Folsom et al. |
| 7,303,497 B1 | 12/2007 | Wige |
| 7,806,673 B2 | 10/2010 | Muscarella et al. |
| 7,850,532 B2 * | 12/2010 | Scherzinger et al. ......... 464/182 |
| 7,935,020 B2 | 5/2011 | Jansen et al. |
| RE42,914 E | 11/2011 | Brinker et al. |
| 8,556,761 B1 * | 10/2013 | Carlton .................. 475/159 |
| 8,596,393 B2 * | 12/2013 | Yoshizue et al. ........... 180/65.51 |
| 8,808,133 B2 * | 8/2014 | Carlton et al. ................ 475/263 |
| 2011/0027006 A1 * | 2/2011 | Hausladen et al. ............... 403/2 |
| 2012/0028748 A1 | 2/2012 | Burgman et al. |
| 2013/0324354 A1 | 12/2013 | Phebus et al. |
| 2014/0045599 A1 * | 2/2014 | Descubes et al. ................ 464/32 |

OTHER PUBLICATIONS

European Patent Office, Extended European Search Report, Apr. 23, 2013, pp. 1-6, Application No. 13154521.2-1752, Applicant: Fairfield Manufacturing Company, Inc., Munich, Germany.

* cited by examiner

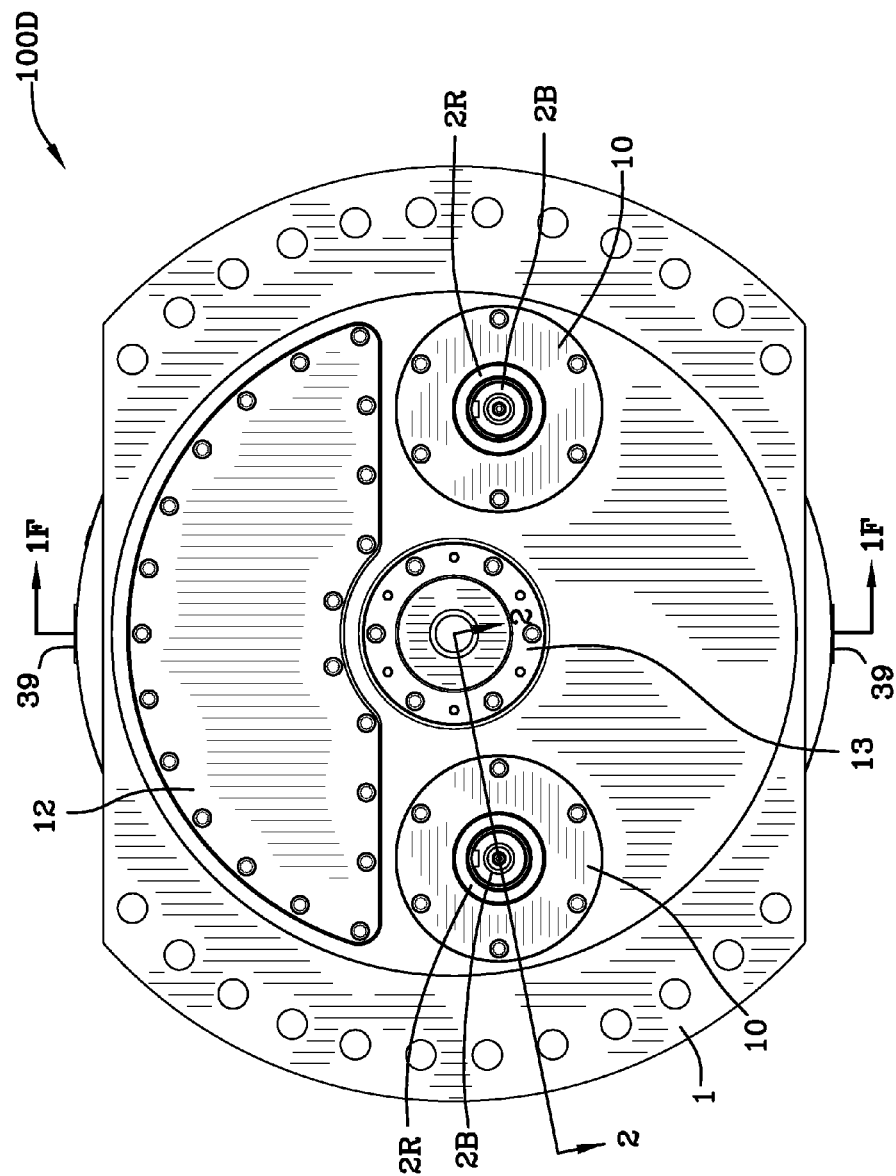

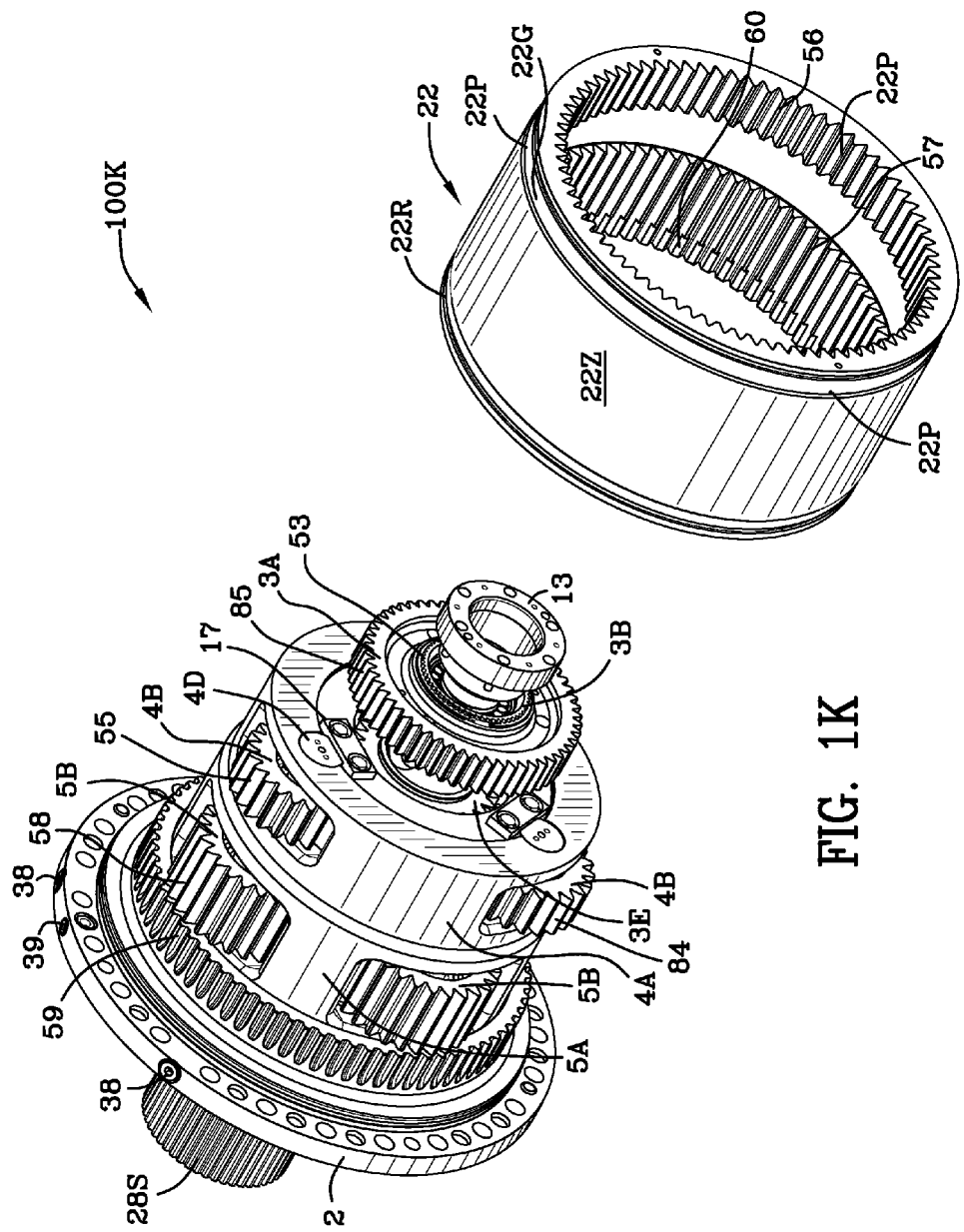

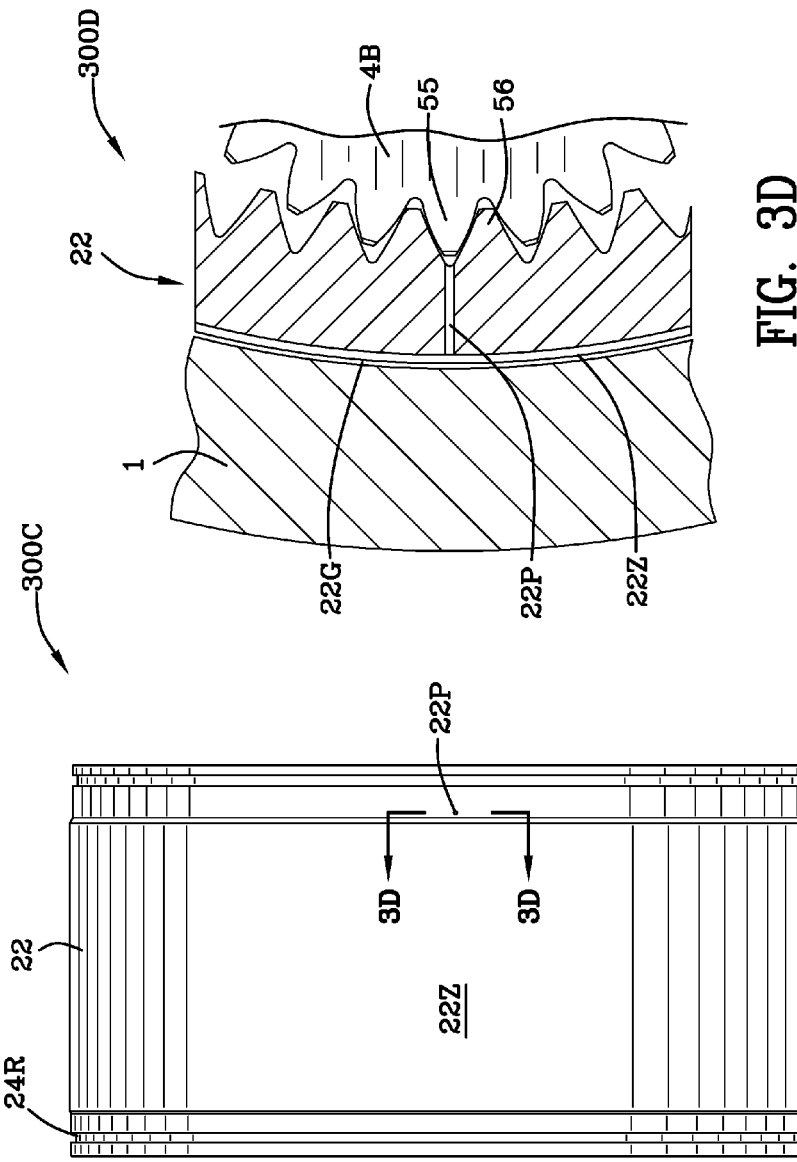

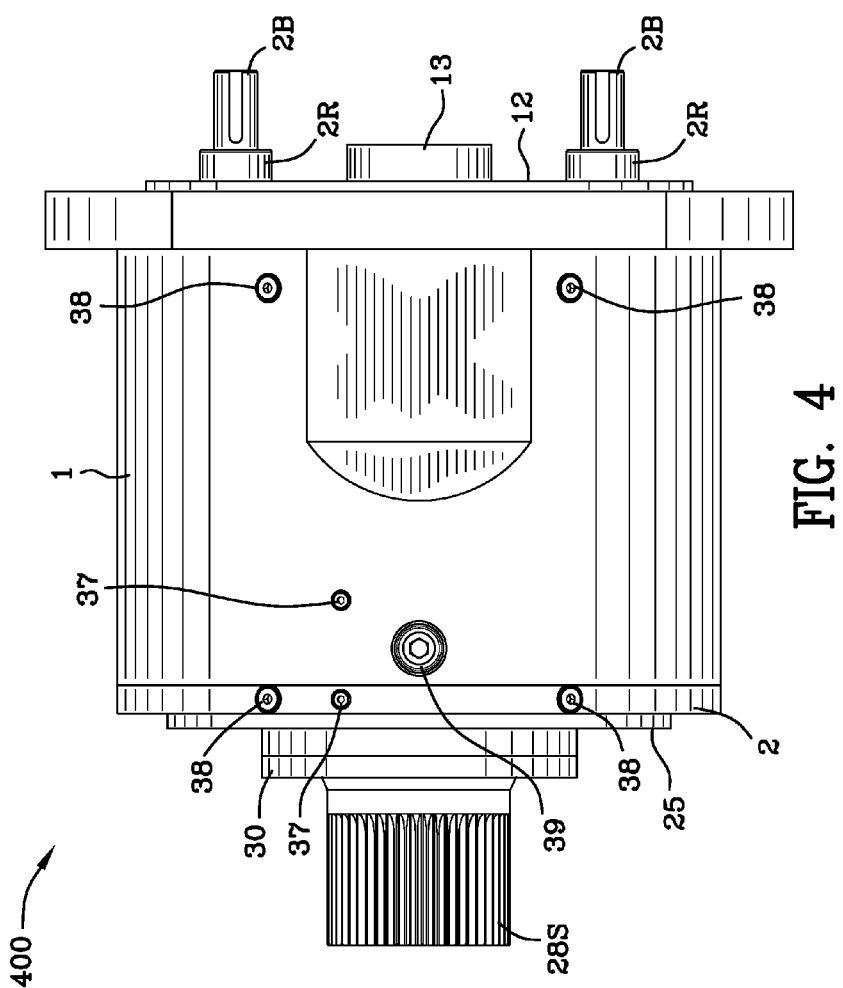

OVERLOAD PROTECTION

FIELD OF THE INVENTION

The invention is in the field of overload protection for gearboxes used to drive earth boring machines.

BACKGROUND OF THE INVENTION

A roadheader is an earth-boring machine which experiences high axial and radial loads on and in the frame of the machine. The roadheader includes a cutter head, a gearbox and a motor (prime mover). When the gearing, most notably the ring gear, is affixed to the housing of the gearbox, the axial and radial forces imparted on the cutter head are transmitted to the ring gear through the housing and cause misalignment of the gears and other components. The misalignment causes abnormal gear wear and ultimately destruction of the gears, carriers and other components.

Roadheaders operate in a range of motion with respect to horizontal. In other words, the cutter head of the roadheader and the gearbox affixed thereto may be inclined with respect to horizontal and creating lubrication problems with some of the bearings within the gearbox as the bearings are lifted out of the lubricating oil.

In the prior art, an internal tube requires internal connections which present the potential for leaks. These leaks allow water to enter within the gearbox and cause it to fail. The potential for leaks is increased due to the extreme vibrations that exist within the gearbox as the cutter head cuts into soil and rock. The tube vibrates within the gearbox and the connections leak due to the vibrations.

U.S. Pat. No. 7,935,020 to Jansen et al. issued May 3, 2011, states that: "A drive train for a wind turbine is provided. The wind turbine comprises a low speed shaft connected to blades of the wind turbine and a higher speed shaft connected to a generator. The drive train also includes a bearing that substantially supports the weight of at least the low speed shaft. A compound planetary gear stage is connected to the low speed shaft and the higher speed shaft, and includes a rotating carrier, a nonrotating ring gear, a plurality of planetary gears, and a rotating sun gear. The sun gear is connected to the higher speed shaft."

U.S. Pat. No. 4,873,894 to Avery et al. issued Oct. 17, 1989, states: "A balanced free-planet drive mechanism includes a reaction ring gear, an output ring gear, an input sun gear arranged along a central axis, and a plurality of floating planet elements individually having a first planet gear engaged with the sun gear, a second planet gear engaged with the output ring gear, and a third planet gear engaged with the reaction ring gear. A required first rolling ring gear resists radially inward movement of the planet elements adjacent the third planet gear, and an optional second rolling ring gear resists radially inward movement of the planet elements adjacent the first planet gears to maintain the planetary elements essentially parallel to the central axis. A plurality of ring segments are connected to the output ring gear and engage a groove in each of the planet elements to maintain the planet elements in a preselected axial position and to transmit relatively low thrust forces. The drive mechanism is easy to assemble in a ground-engaging wheel of a truck or the like, with the output ring gear being connected to rotate with the wheel. The incorporation of the drive mechanism in a wheel eliminates the usual planet carrier and planetary bearings associated with a conventional multi-stage planetary final drive, and is lighter in weight and less costly while fitting compactly within the same general space envelope."

SUMMARY OF THE INVENTION

Floating Gearbox

When gears are under load, forces within a gear system align the gears and other components of the gear system so that optimum load balancing occurs, that is, the gears align themselves. External forces not generated by the gear system move the gears out of this alignment and thus adversely affect the gear position causing damage and premature wear. The floating gear system of the invention allows gears to retain their most favorable alignment position.

An electric motor drives an input gears via spline connections. The input gear drives an intermediate gear. The intermediate gear drives the shaft which, in turn, drives the first sun gear such that the intermediate gear and the first sun gear rotate together at the same speed. The first sun gear drives a set of first planet gears. Preferably there are three first planet gears. The planet gears are engaged with a static (fixed) ring gear. A first pair of spherical bearings is interposed between each first planet gear and each first planet shaft. The first pair of spherical bearings is separated from each other and provides support for the first planet gear. Each first planet shaft is affixed to the first planetary carrier. The first planet gear forces the first planet carrier to rotate and thus drives second sun. Second sun includes an external spline and a gear.

The second sun gear drives four second planet gears. The second planet gears engage static (rotationally fixed) ring gear. A second pair of spherical bearings is interposed between each second planet gear and each second planet shaft. The second pair of spherical bearings is separated from each other and provides support for the second planet gear. Each second planet shaft is rotatably affixed to the second planetary carrier. The second planet gear forces the second planet carrier to rotate and thus drive the output shaft.

The gears are allowed to float. Both vertical and horizontal forces act on the cutter head. These forces are transmitted through the gearbox and back to the supporting structure. In the present invention, the gears run independent of the housing, that is, they float. The ring gear floats. The ring gear is spaced apart from the housing. A small annular gap exists between the ring gear and the housing, thus deflection due to external forces in the housing doesn't affect the gear alignment because the gears aren't directly attached to the housing. The ring gear has torque passing through it and thus is anchored back (against rotation) to the housing through a spline connection between the ring gear and the cover. The cover is affixed to the housing and the spline connection acts like a hinge. The ring gear and housing deflect independently of each other.

Spline connections in the present invention make the gears float. Splines have small gaps in them. These gaps allow small relative movement between meshing splines and help the gears find a position that best suits them. The spline connections include the connection between ring gear and cover; the second planet carrier and the output shaft; the first carrier and the second sun; and, the first sun gear and the splined shaft, and, the intermediate gear and the splined shaft.

When gears are under load, the forces within the gear system align the gears so that optimum load balancing occurs, that is, the gears align themselves. In the prior art, external forces not generated by the gear system, move the gears out of alignment and thus adversely affect their positions. The present invention allows the planetary gear systems to retain their most favorable alignment positions.

A gearbox which includes a housing having a cover is disclosed. The cover is affixed to the housing. The cover includes an external spline located on a central portion thereof. There are two input gears driven by prime movers, for example, electric motors. The input gears drive an intermediate gear which is known as a drop down gear. The intermediate (drop down) gear includes an internal spline. The splined shaft includes a first external spline and a second exterior spline. The internal spline of the intermediate gear engages the first exterior spline of the shaft rotating the shaft with the intermediate gear. A centrally located tube resides along a first longitudinal axis of the housing. A centrally located adapter also resides along a first longitudinal axis of the housing. The centrally located adapter is affixed to the housing. The centrally located adapter and centrally located tube are stationary. There are two spherical bearings, the shaft input spherical bearing and the shaft output spherical bearing, which enable the components of the gearbox to float within the gearbox thus avoiding deformation and subsequent destruction of the components. The components include the ring gear, a splined shaft, a first planetary system, a second planetary system, and an output shaft. Each of the planetary systems includes a sun gear, a plurality of planet gears, a planet gear carrier, and a plurality of planet gear shafts.

A first shaft input spherical bearing is interposed between the stationary tube and the rotating input shaft. A first sun gear includes an internal spline. The second external spline of the input splined shaft engages the internal spline of the first sun gear driving the sun gear therewith.

A plurality of first planet gears is carried by a first planet gear carrier. Each planet gear is pinned to the first planet gear carrier by a first planet gear shaft. A first pair spherical bearings is interposed between each of the first planet gear shafts and each of the first planet gears. The first sun gear drives the first planet gears. The first planet gear carrier restrains each of the first pair of spherical bearings interposed between the first planet gear and the first planet gear shaft against longitudinal movement. The first planet gear carrier restrains each of the first planet gears with respect to its respective first planet gear shaft holding them against longitudinal movement in their respective planet gear shaft. A ring gear is mounted within the housing and includes an internal spline. The internal spline of the ring gear engages the external spline of the cover affixing the ring gear against rotation with respect to the cover/housing.

The plurality of first planet gears engages the ring gear driving the first planet carrier. The first planet carrier includes an internal output spline. A second sun includes an external spline and a sun gear.

The internal output spline of the first planet carrier drives the external spline of the second sun gear. The plurality of second planet gears engages the ring gear driving the second planet carrier. The gear of the second sun drives the second planet gears which, in turn, drive the second planet carrier. The second planet gears engage the ring gear. A second pair of spherical bearings is interposed between the second planet gear shaft and the second planet gear. The second planet gear carrier restrains the second pair of spherical bearings interposed between each of the second planet gears and the second planet gear shaft against longitudinal movement. The second planet gear carrier restrains the second planet gears with respect to its respective second planet gear shaft against longitudinal movement holding each of them against longitudinal movement. The second planet carrier includes an internal output spline.

The output shaft includes an external spline. The housing, the cover and the output shaft have a longitudinal axis. The internal output spline of the second planet carrier drives the external spline of the output shaft.

A shaft output spherical bearing resides intermediate the output shaft and the cover of the gearbox supporting the output shaft. The shaft output spherical bearing permits angular displacement of the output shaft with respect to the longitudinal axis of the output shaft. The ring gear pivots with respect to the cover/housing. The shaft output spherical bearing enables the ring gear to float within the housing and not engage the housing.

A gearbox in combination with a roadheader is also disclosed. A prime mover, a cutter head, a gearbox are disclosed. The gearbox includes: a housing having an inner surface and an external spline; an input shaft; a first planetary gear system driven by the shaft; and, a second planetary gear system driven by the first planetary gear system. A ring gear includes an internal spline. A first pair of spherical bearings supports the first planetary gear system. A second pair of spherical bearings supports the second planetary gear system. The ring gear includes an outer surface and the outer surface is substantially cylindrically shaped. The outer surface of the ring gear is spaced apart from the inner surface of the housing forming an annular gap therebetween. The internal spline of the ring gear engages the external spline of the housing affixing the ring gear against rotation with respect to the housing. The ring gear is pivotable with respect to the housing. An output shaft is driven by the second planetary gear system. The gearbox is interposed between the prime mover and the cutter head. The prime mover delivers power to the input shaft of the gearbox and the output shaft of the gearbox drives the cutter head.

Lubrication

A bearing lubrication system is disclosed which includes a gearbox housing wherein the gearbox housing includes a planetary gear system, the planetary gear system includes planet gears, an external spline, an interior surface and an exterior surface. Lubricating oil resides in the gearbox housing and the planet gears pass through the lubricating oil in the gearbox housing. The floating ring gear resides within the gearbox housing and the floating ring gear is substantially cylindrically shaped. The floating ring gear includes an inner portion and an outer surface. The inner portion of the floating ring gear includes an internal spline and an internal gear. The internal spline of the floating ring gear engages the external spline of the gearbox housing preventing rotation of the floating ring gear with respect to the housing. The exterior surface of the floating ring gear is radially spaced apart from the interior surface of the gearbox housing forming an annulus between the gearbox housing and the floating ring gear.

The planet gears of the planetary gear system engage the internal gear of the floating ring gear. The internal gear of the floating ring gear includes a first passageway therein for receiving oil from the meshing of the planet gears with the internal gear of the floating ring gear. The first passageway extends through the floating ring gear. The outer surface of the floating ring gear includes first and second grooves therein. First and second O-rings reside in the first and second grooves of the outer surface of the O-rings and seal the annulus formed by the space between the exterior surface of the ring gear and the interior surface of the housing. The gearbox housing includes a second passageway in communication with the annulus. The second passageway in the gearbox housing extends to the exterior surface of the housing. A cover affixed to the housing includes a third passageway in communication with the second passageway of the gearbox. The second passageway and the third passageway are joined together at a joint and the joint is sealed with an O-ring.

The cover includes a void or cavity therein. The third passageway communicates between the joint and the void in the cover. The cover includes a fourth passageway and a circumferential recess. The fourth passageway communicates between the void in the cover and the circumferential recess in the cover. The shaft output spherical bearing is mounted adjacent the circumferential recess in the cover. The lubricating oil is forced and pumped into and through the first passageway through the floating ring gear and into the annulus between the gearbox housing and the floating ring gear. Lubricating oil from the annulus is pumped into and through the second passageway and through the joint between the second and third passageway. Then the oil is pumped through the third passageway into the void/cavity in the cover. Thereafter the oil passes through the fourth passageway between the void in the cover and the circumferential recess in the cover and lubricating the shaft output spherical bearing mounted adjacent the recess.

A bearing lubrication system is disclosed which includes a gearbox housing wherein the gearbox housing includes a planetary gear system, the planetary gear system includes planet gears, an external spline, an interior surface and an exterior surface. The gearbox includes an output shaft and the shaft output spherical bearing is interposed between the output shaft and the cover. Lubricating oil collects in the void and the gearbox tilts at an angle up to 43° with respect to horizontal during operation. A floating ring gear resides within the gearbox housing and is substantially cylindrically shaped. The floating ring gear includes an inner portion and an outer surface. The inner portion of the floating ring gear includes an internal gear. The floating ring gear engages the gearbox housing preventing rotation of the floating ring gear with respect to said housing. The exterior surface of said floating ring gear is radially spaced apart from the interior surface of the gearbox housing forming an annulus between the gearbox housing and the floating ring gear. The planet gears of the planetary gear system engage the internal gear of the floating ring gear. The internal gear of the floating ring gear meshes with the planet gears pumping oil through the floating ring gear, the annulus, the gear box housing, the cover and the shaft output spherical bearing.

The shaft output spherical bearing which resides between the cover/housing and the output shaft has oil pumped to it to ensure that it is lubricated at all times. When the cutter head resides horizontally with respect to the earth, oil is supplied to the shaft output spherical bearing by virtue of the oil within the housing. At this time the shaft output spherical bearing also receives oil from the pumping system of the invention. The cutter head, and thus the gearbox, can tilt substantially with respect to the horizontal axis of the gearbox. The shaft output spherical bearing when inclined is lifted up out of the oil residing in the housing. Oil, or other lubricant, normally fills the housing up to the 50% level based on height. A sight glass is provided in the window which enables the roadheader user to view the oil level in the gearbox. Ring gear and surrounding pieces act, in addition to their normal function, like a pump. In the ring gear, just above the first planet gears, there are three small holes between the teeth of the ring gear. The three holes are spaced 120° apart. As the gear teeth of the first planet gears and the ring gear mesh (engage), oil is forced up into these holes. Oil will then flow to and then through the narrow cavity that is between the ring gear and the housing. O-rings at the ends of the ring gear keep the oil from leaving the volume bounded by the exterior surface of the ring gear and the internal surface of the housing. Oil is then forced though passageways and cavities in the housing and cover so that oil reaches the shaft output spherical bearing, and thus keeps the shaft output spherical bearing lubricated.

The gearbox of the invention is large and deep holes in the housing for a lubrication system are costly and difficult to manufacture. Instead, the invention obviates the need for deep holes. The gap between the ring gear and the housing is adapted to transport oil. Both ends of the ring gear are sealed with the O-rings. This gap provides an oil passage for the majority of the distance—the distance up to the front of the gearbox. The first planet gear pumps the oil used for lubricating the shaft output spherical bearing instead of the second planet gear because the first planet gear rotates much faster than the second planet gear and therefore makes a much more effective pump. After the gap, oil passes through some relatively short length passageways and thereafter falls into a cast cavity/void in the cover. This cast cavity is used in the lubrication system and obviates deep holes. After the cast cavity, oil passes through another short passageway and reaches the shaft output spherical bearing.

Overload Protection

The gearbox has over-torque protection. The input shaft includes a narrowed diametrical portion which acts as a fuse. In the prior art, if excessive force is applied to the cutter head an internal gear component fails. The input shaft acts as a fuse and breaks at the narrowed diametrical portion. When the fuse breaks, the portion of the shaft that is still connected to the electric motor spins harmlessly within a bushing. The bushing prevents the spinning portion of the input shaft from entering the bore in the gear too far. A screw retains the portion of the shaft bearing the external spline. The internal spline of the bore in the input gear remains meshed together with the external spline of the shaft after breakage or fracture of the shaft. This over-torque protection system prevents damage to the ring gear as well as to components of the rest of the gearbox. The two broken portions of the input shaft can easily be replaced.

To prevent damage to the input gear while the outer half of the input shaft is spinning, a bushing permits spinning to occur in a controlled fashion and thus prevent damage to the input gear. In other words, the bushing acts as a shoulder and prevents the input shaft from moving inwardly toward the input gear thus damaging the gear. When the fuse is not broken and the gearbox is running in a normal, proper fashion, the bushing sees no rotation and it radially supports the input shaft. The bushing only functions when the fuse breaks. If any damage occurs to the O-ring when the fuse breaks, it can be easily replaced. The function of the O-rings along the input shaft is to retain grease at the bushing and the spline. The input shaft includes an external spline which mates with an internal spline on the input gear.

An overload protection device in combination with a prime mover and gearbox transmission supplying torque through said gearbox transmission to a load is disclosed. An input shaft includes a bore therethrough enabling affixation of the input shaft to an input gear. The input shaft includes a key for coupling to the prime mover and for rotation therewith. The input shaft also includes an external spline which mates with an internal spline in the bore of the input gear. The prime mover transmits torque to the input shaft which drives the input gear. The input gear includes a bore therein. An internal spline in the bore of the input gear meshes with the external spline of the input shaft. The bore of the input gear includes a shoulder therein, and the bushing resides in the bore of the gear and engages the shoulder of the bore. The input gear of the gearbox transmission drives a planetary gear system which, in turn, supplies power to the load.

The input shaft includes an annular groove which breaks when the load impressed upon the cutting tool of the roadheader is too large. Upon overload of the gearbox transmission, the input shaft breaks at the location of the annular groove. The input shaft includes a bore therein and the annular groove in combination with the bore through the shaft results in a thin section which acts as a fuse. The input shaft is affixed to the input gear against longitudinal movement such that the input shaft will not move longitudinally after the input shaft breaks.

Cooling Cavities

A gearbox, comprising: a housing and a floating gear means for protecting a gear mechanism from damage due to axial and radial forces applied to the gearbox is disclosed. A first cooling compartment and a second cooling compartment are disclosed. The first and second cooling compartments are isolated from the floating gear means. First and second ports supply cooling fluid to the first compartment, and, the third and fourth ports supplying cooling fluid to the second compartment.

It is not possible for cooling water to leak into the gearbox as the gearboxes are sealed with respect to the cooling compartments. Instead, any water leakage falls harmlessly to the ground. Water in the cavities/compartments is isolated from the gearbox by a thick, heat conductible, wall of steel. Cooling cavities/compartments exists at each end of the gearbox, behind the rear plate and the front plate. Plugs are removed from threaded holes, and hoses are attached to the threaded holes for pumping cooling water into and through the cavities/compartments. The cooling water in the cavities soaks up heat generated in the gearbox.

There is a tube that passes through the central portion of the gearbox. When the gearbox is installed in an earth-boring machine, a pipe carrying cooling fluid is installed which passes through this tube and feeds water to the cutter head.

BRIEF DESCRIPTION OF THE DRAWINGS

FIG. 1D is a right side view of the gearbox where power is input to the gearbox.

FIG. 1K is a perspective view of the floating gearbox with the ring gear shown in an exploded position.

FIG. 3C is a plan view of the floating ring gear illustrating one of the lubricant passageways therethrough.

FIG. 3D is a cross-sectional view of the floating ring gear illustrating the lubricant passageway therethrough, the housing, the meshing gear and the gap between the ring gear and the housing.

FIG. 4 is a top view of the gearbox illustrating cooling water plugs.

DESCRIPTION OF THE INVENTION

Figure 1:
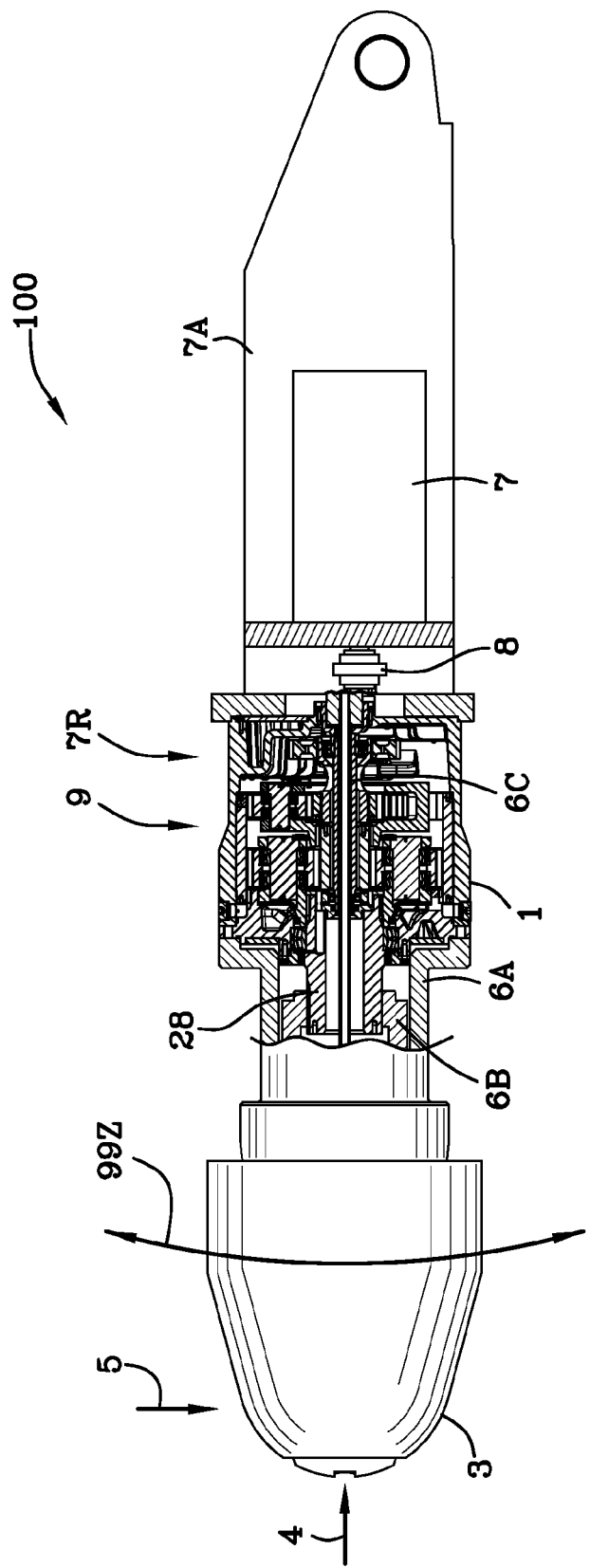
FIG. 1 is a schematic view of a roadheader including the cutter head, gearbox and prime mover.
Figure 1A:
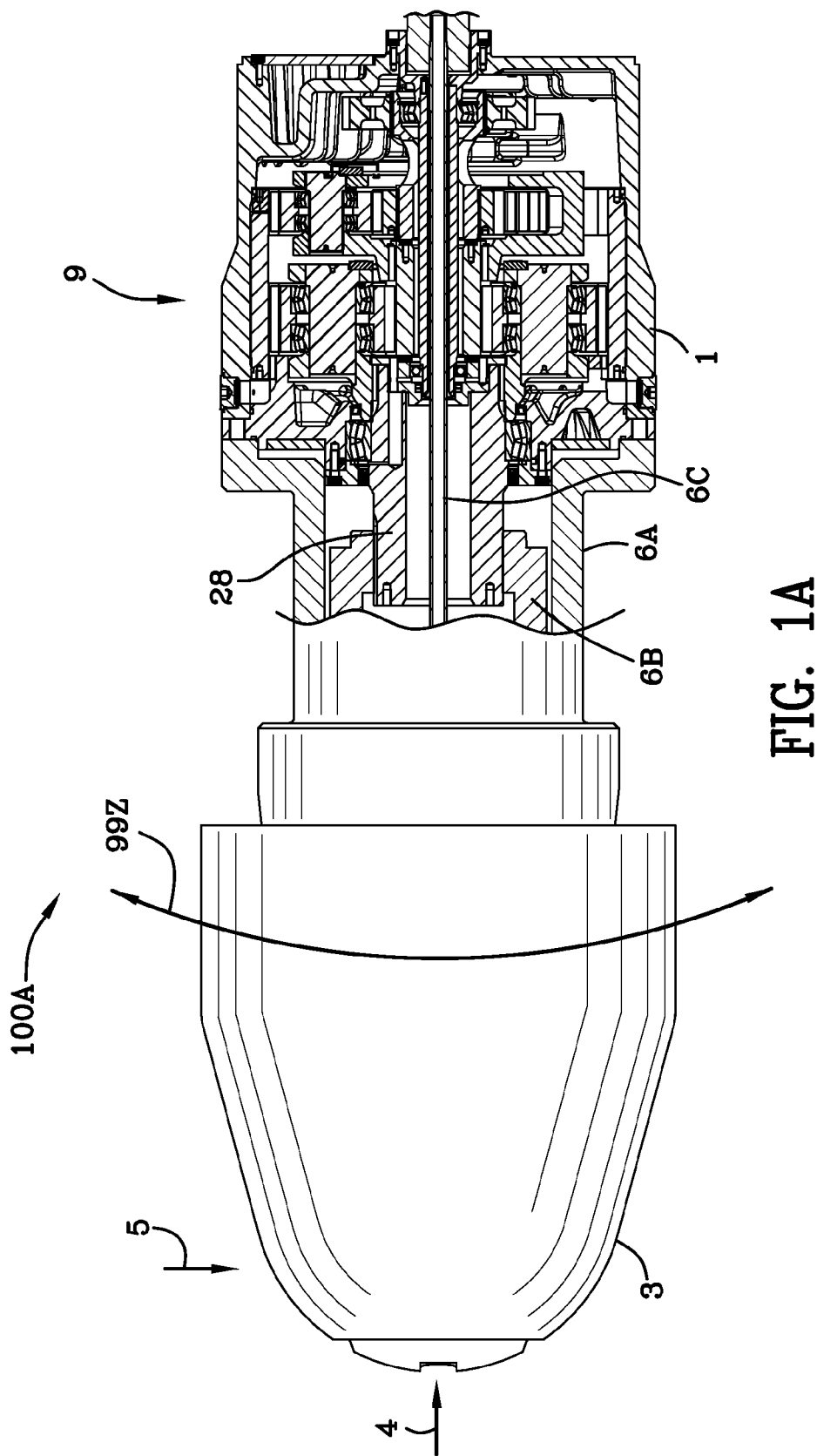
FIG. 1A is an enlarged portion of the schematic view of FIG. 1 illustrating the cutter head and gearbox.

FIG. 1 is a schematic view 100 of a roadheader 7R including the cutter head 3, gearbox 9 and prime mover 7. FIG. 1A is an enlarged portion 100A of the schematic view of FIG. 1 illustrating the cutter head 3 and gearbox 9 in more detail. As illustrated in FIGS. 1 and 1A, electric motors 7 drive input gears 2B which in turn drive, via spline connections, input gears 2A. Input gears 2A drive intermediate gear 3A.

Still referring to FIGS. 1 and 1A, a horizontal or axial force 4 is imparted on the cutter head 3 in earth boring operations. The roadheader (earth boring machine) is forced into earthen material which may be very hard. The cutter head 3 includes spikes thereon (not shown) which forcibly cut into the earthen material. All of the axial forces 4 are transmitted through the frame of the cutter head 3, the coupling frame 6A, the housing 1 of the gearbox 9, the cover 2 of the gearbox 9, and the motor frame 7A. Similarly, the cutter head is subject to radial force 5 as illustrated in FIGS. 1 and 1A. All of the radial forces are transmitted through the frame of the cutter head 3, the coupling frame 6A, the housing 1 of the gearbox 9, the cover 2 of the gearbox 9, and the motor frame 7A. The vertical and horizontal forces are not transmitted to the ring gear, and, therefore, not transmitted to the first and second planetary gear systems. The planetary gear systems within the gearbox are supported by a shaft input spherical bearing and a shaft output spherical bearing enabling the planetary gear systems to float, that is, to self-center and align and to avoid deformation and misalignment caused by forces normally transmitted (in the prior art) to the gear systems by the frame of the gearbox. The shaft input and output spherical bearings, a plurality of meshing internal and external splines, and a plurality of meshing gears permit the planetary gear systems to float, that is, to self-center and align. Tolerance stack up of the components, namely, the various gears, splines, carriers etc. cause the components of a gearbox to find a natural orientation and alignment within the gearbox.

The gears are allowed to float. Vertical and horizontal forces act on the cutter head. These forces are transmitted through the gearbox and back to the supporting structure. In the prior art, the ring gear is fixed to the housing and forces transmitted to the housing cause misalignment of the ring gear and other components of the planetary gear system. This misalignment will cause abnormal alignment, gear wear and damage to the planetary gear system.

In the instant invention the gears run independent of the housing; that is, they float. Ring gear 22 floats as it is separate from the housing 1. A small annular gap 22G exists between the ring gear 22 and housing 1, and, thus forces in the housing 1 do not affect alignment of the gears within the housing.

The ring gear 22 has torque passing through it and is anchored to the housing 1. This is done through a spline connection 59, 60 between the ring gear 22 and the cover 2 which acts like a hinge and pivots as indicated by reference numeral 99. Cover 2 is affixed to housing 1. Ring gear 22 and housing 1 deflect independently of each other.

Still referring to FIGS. 1 and 1A, the drive shaft 6A in the roadheader is coupled to the output shaft 28 through a coupling 6B. Coupling 6B further isolates and prevents any force from transmission to the output shaft 28. Coupling 8 couples the input of the electric motor to the input shaft 2B. Channel 6C functions as a water conduit through the roadheader to cool the cutter head 3 during operation.

Figure 1B:
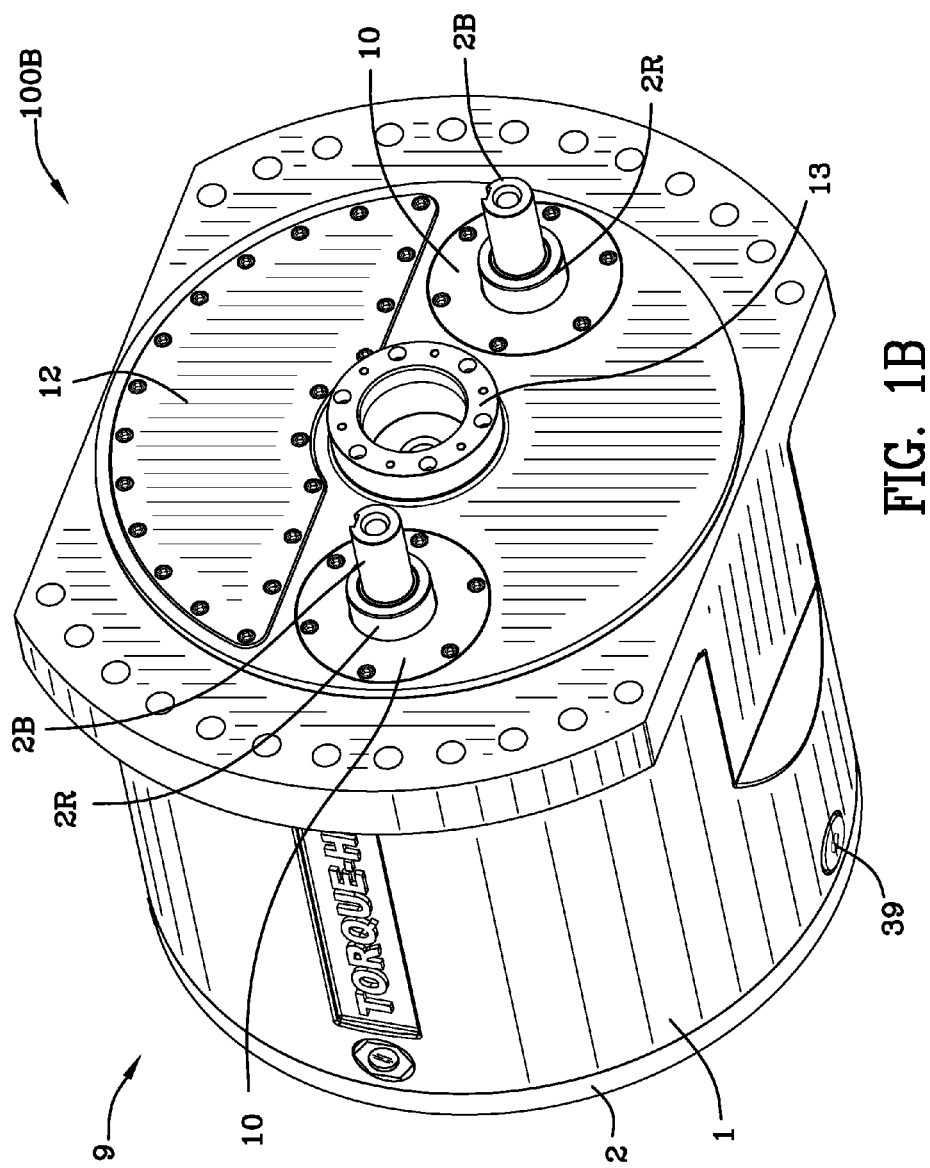
FIG. 1B is a perspective view of the gearbox.
Figure 1C:
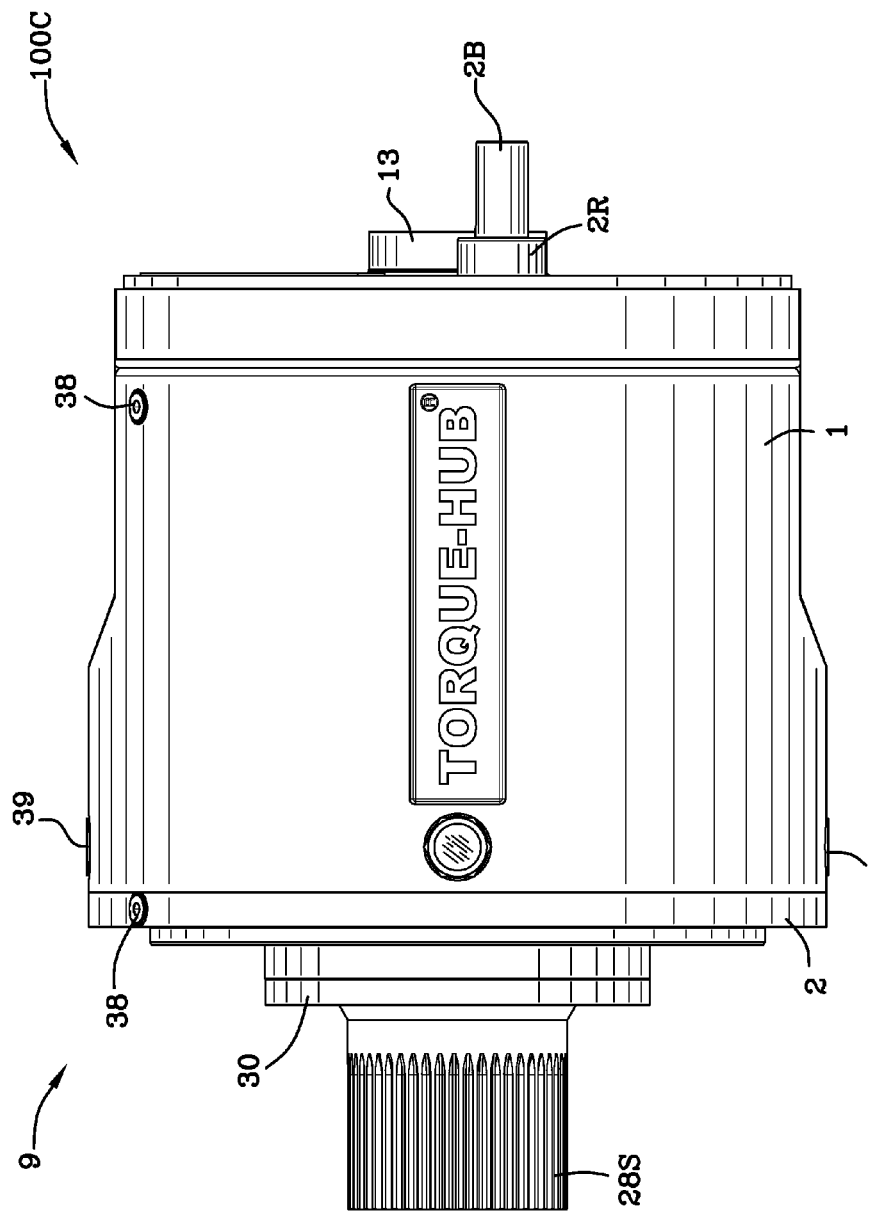
FIG. 1C is a front view of the gearbox.
Figure 1E:
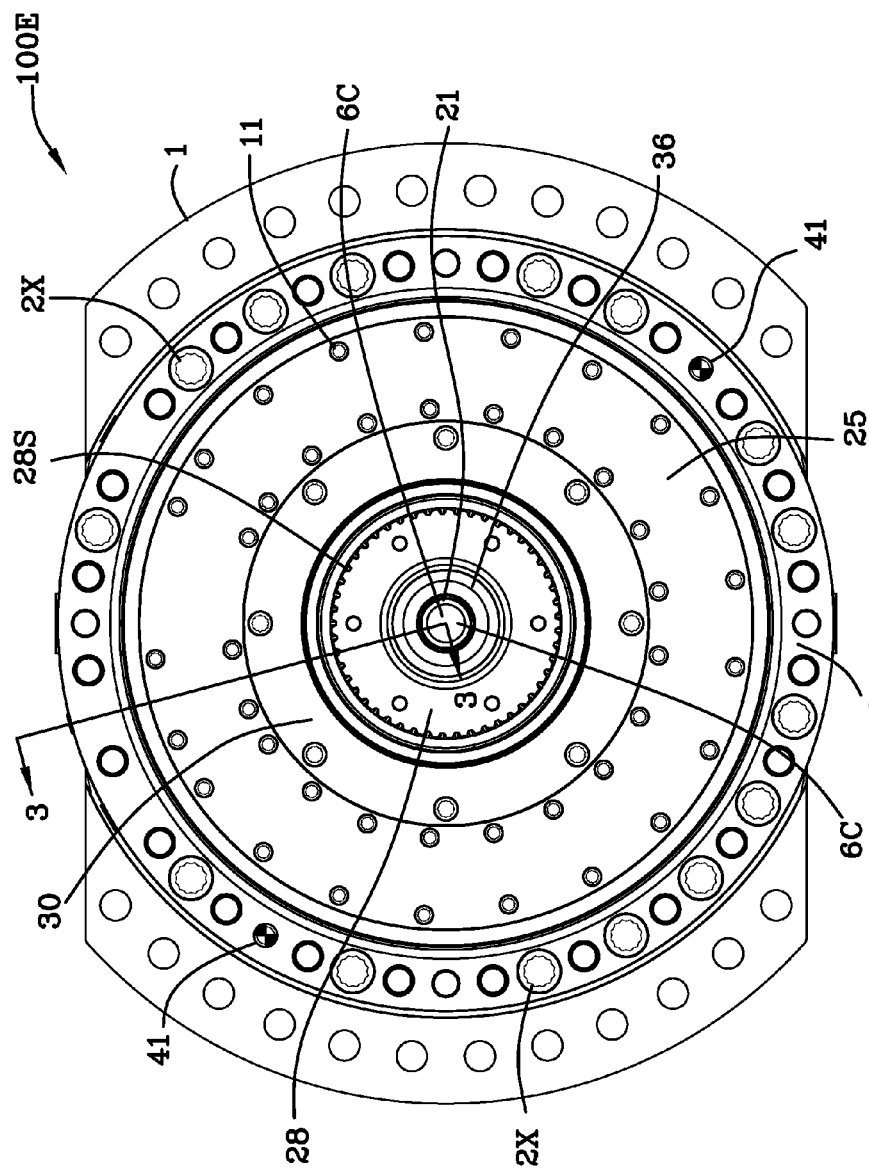
FIG. 1E is a left side view of the gearbox where power is output from the gearbox.

FIG. 1B is a perspective view 100B of the gearbox 9 illustrating input shafts 2B, 2B and bearing retention plates 10, 10. Housing 1, cover 2 and an unnumbered sight glass are illustrated in FIG. 1B. Receptacles 2R, 2R of input gears 2A, 2A receive input shafts 2B, 2B. Referring to FIGS. 1B and 1F, adapter 13 is bolted to housing 1 with screws 13A as illustrated in FIG. 1F. Further, the rear cooler cap 12 is bolted to housing 1 with screws 12S. Front cooler cap 25 is affixed to the cover 2 as illustrated in FIG. 1E by screws 11. Tube 21 is affixed to adapter against rotation by dowel pin 26 as illustrated in FIGS. 1F and 1I.

FIG. 1E is a left side view 100E of the gearbox 9 where power is output from the gearbox 9 by output shaft 28 and through spline connection 28S. FIG. 1E further illustrates bearing cover 30, retainer 36, and tube 21.

Referring to FIGS. 1E and 1F, bearing cover 30 is affixed to the cover 2 by screws 30S and retains the shaft output spherical bearing 27. Dowel pins 41 are used to correctly orient the cover 2 with respective receptacles in housing 1. Screws 2X secure the cover 2 to the housing 1. Lip seal 31 is interposed between bearing cover 30 and output shaft 28.

Figure 1F:
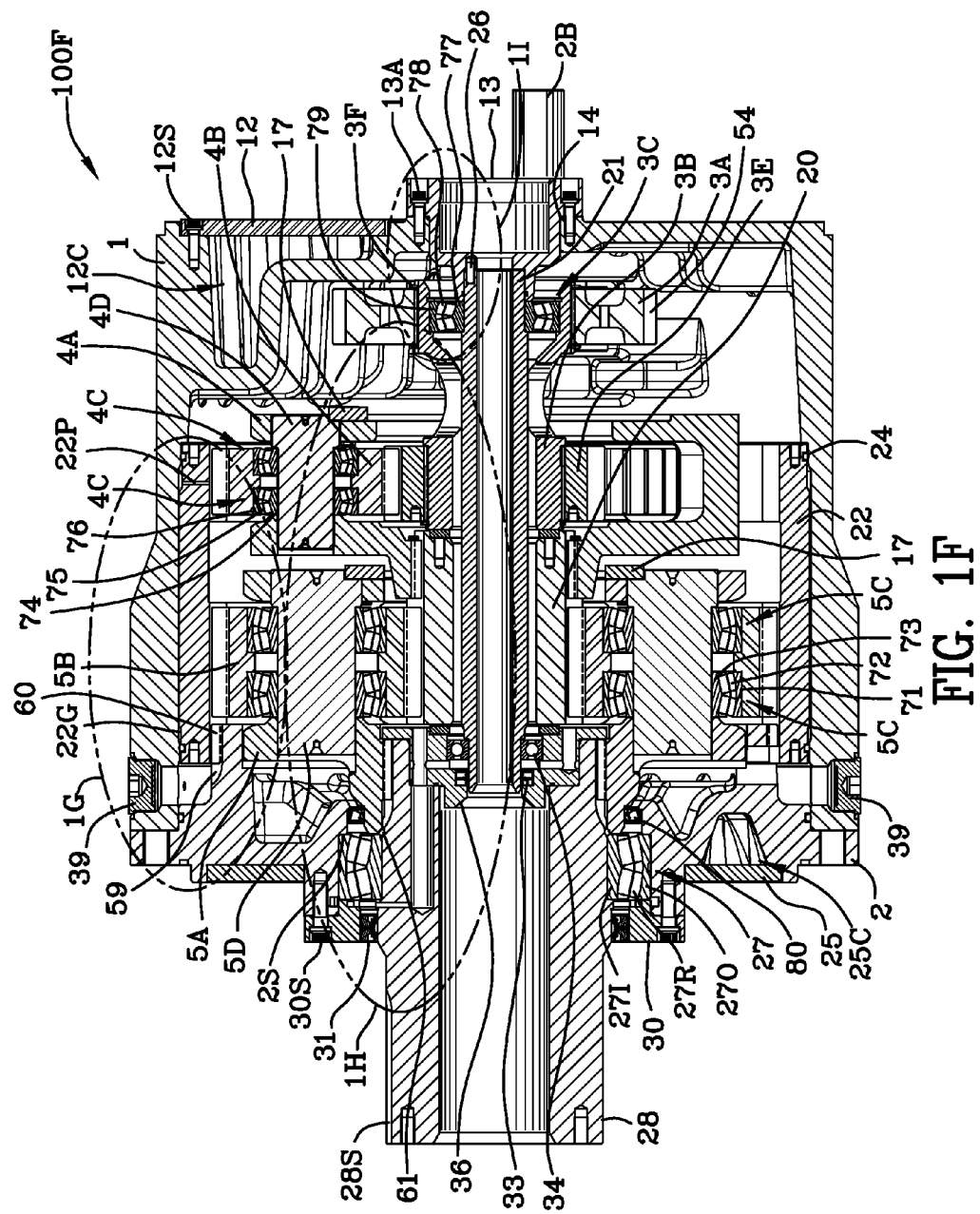
FIG. 1F is a cross-sectional view taken along the lines 1F-1F of FIG. 1D illustrating the first planetary gear system, the second planetary gear system, the floating ring gear, the input to the first planetary gear system, and the output from the second planetary gear system, all of which are supported by the shaft input and output spherical bearings and connected with splines enabling the gear systems and ring gear to float within a fixed housing.
Figure 1G:
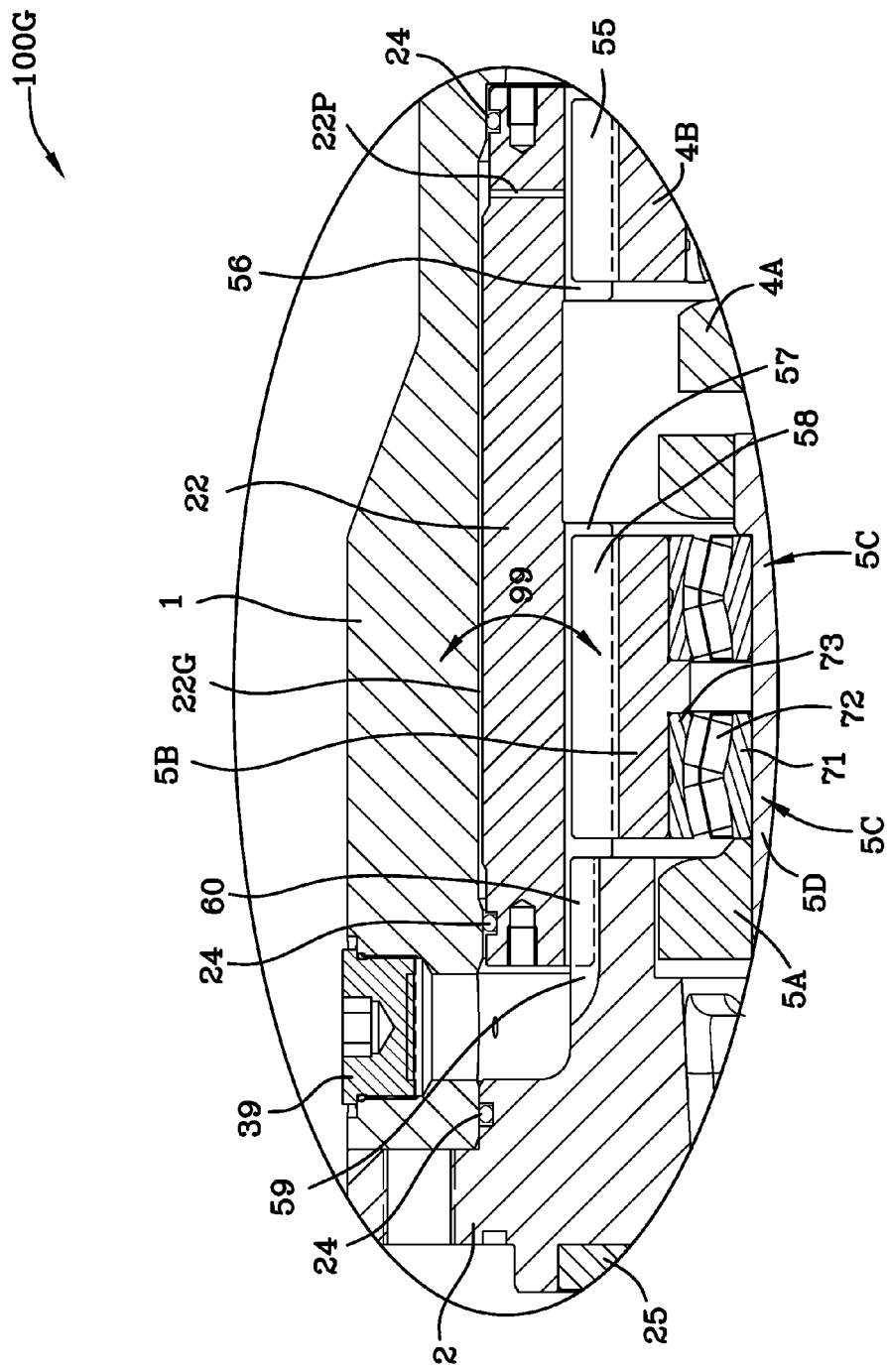
FIG. 1G is an enlarged portion of the cross-sectional view of FIG. 1F illustrating the floating ring gear, the spline connection between the floating ring gear and the cover, and a portion of the lubrication system.
Figure 1H:
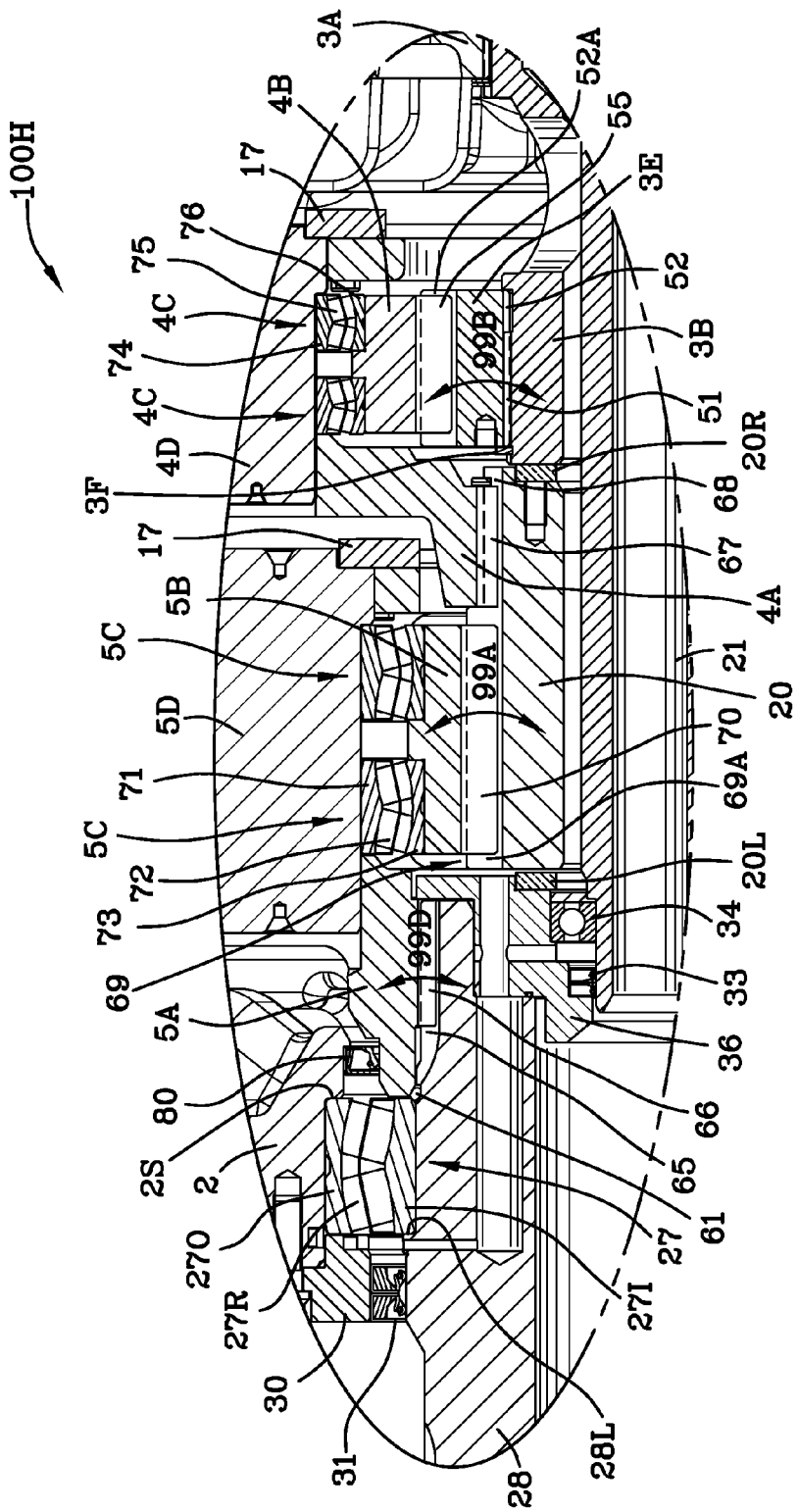
FIG. 1H is an enlarged portion of the cross-sectional view of FIG. 1F illustrating the spline input to the first sun driving the first planetary gear set, the first planet carrier driving the second sun, the second sun driving the second planetary gear set and the second planet carrier driving the output spindle (shaft), all of which are supported by shaft input spherical bearing and the shaft output spherical bearing enabling the gear systems and ring gear to float within a fixed housing.
Figure 1I:
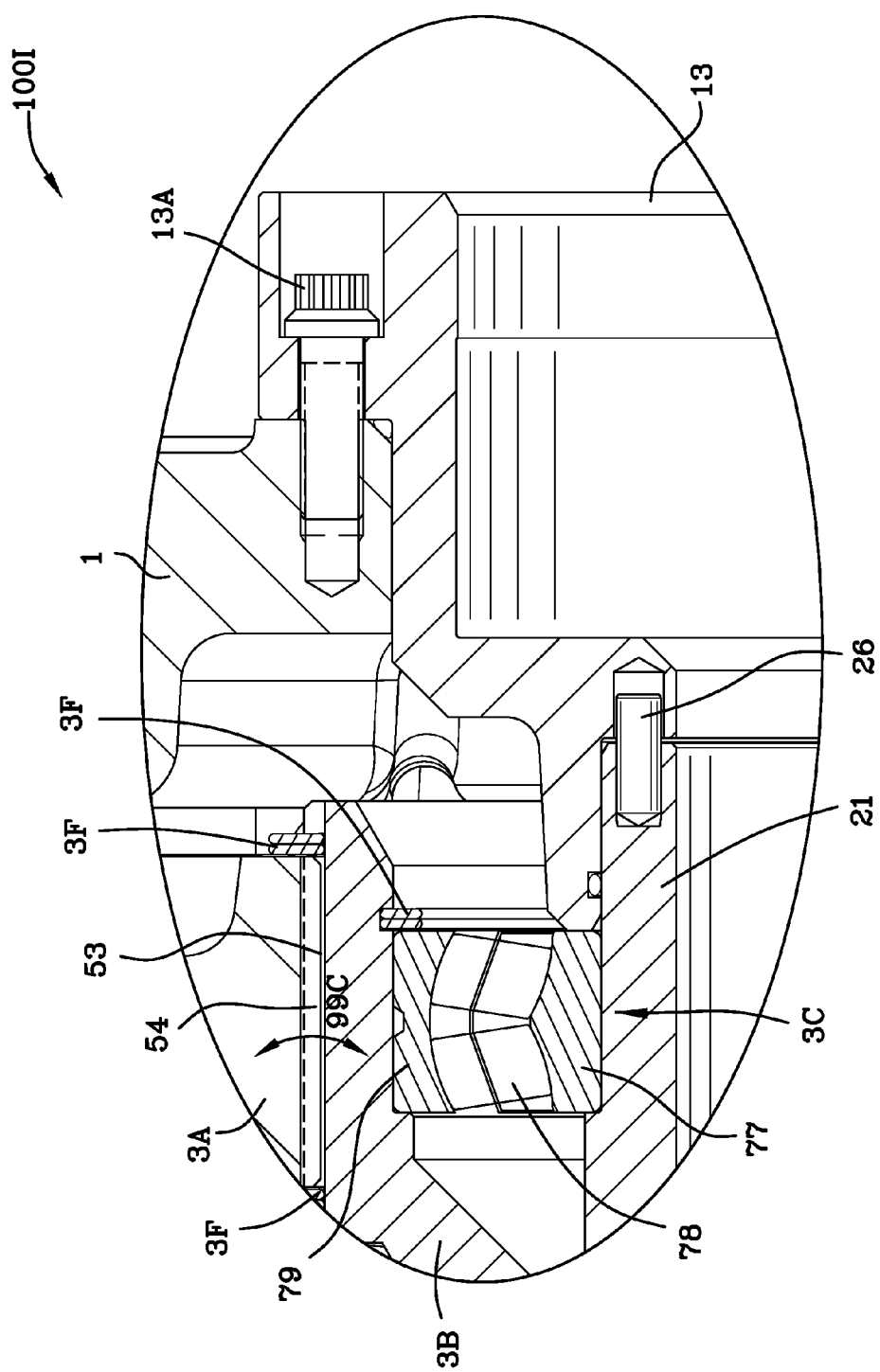
FIG. 1I is an enlarged portion of the cross-sectional view of FIG. 1F illustrating the shaft input spherical bearing interposed between the centrally located support tube and the splined shaft driven by the intermediate gear.

Referring to FIGS. 1F and 1H, the shaft output spherical bearing 27 includes an inner race 27I, and outer race 27O, and rollers 27R. Shaft output spherical bearing 27 is interposed between output shaft 28 and cover 2 and is longitudinally held in place by bearing cover 30, a shoulder 28L on shaft 28, and a shoulder 2S of cover 2. Tube 21 is stationary and affixed to adapter 13 proximate the rear end of the gearbox by dowel 26 and is supported by retainer 36 proximate the front end of the gearbox 9. Retainer 36 is affixed to output shaft 28 by a screw in a different plane which is not shown. Retainer 36 rotates with output shaft 28.

Referring to FIG. 1F, bearing 34 is interposed between tube 21 and retainer 36 enabling rotation of the retainer 36 while supporting second planet carrier 5A. Lip seal 33 is interposed between retainer 36 and tube 21 retaining lubricant for bearing 34 and other components. Retainer 36 retains shaft 28 from extraction. O-ring 61 is retained axially between shaft output spherical bearing 27 and second planet carrier 5A.

FIG. 1C is a front view 100C of the gearbox 9 illustrating most of the same principal elements illustrated in FIG. 1B. FIG. 1C illustrates output shaft 28 having an external spline 28S for mating with coupling 6B. FIG. 1C further illustrates bearing cover 30 for retention of shaft output spherical bearing 27 which supports output shaft 28 as illustrated in FIG. 1F. Cooling cover plate 12 is also illustrated in FIG. 1D.

Figure 2:
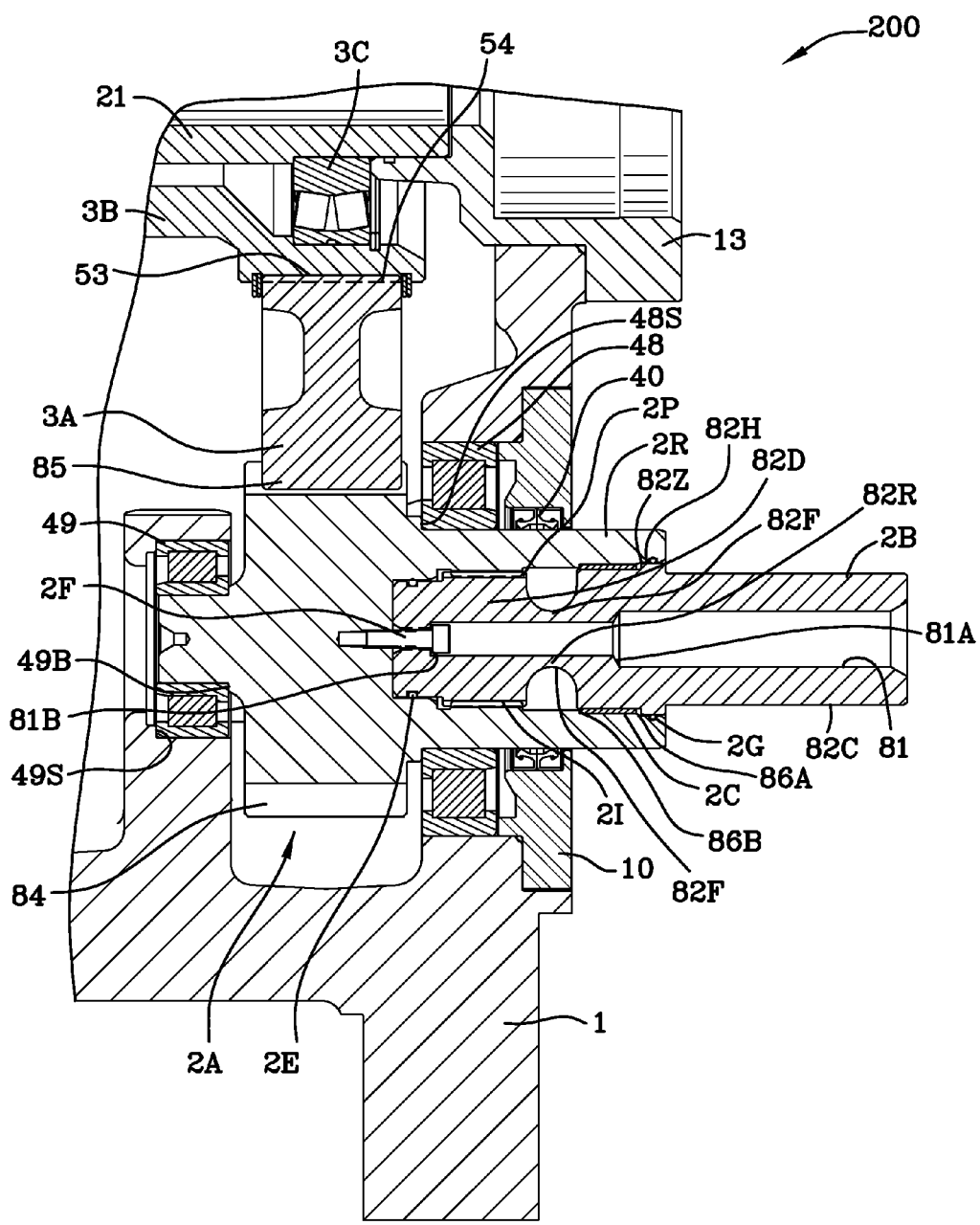
FIG. 2 is a cross-sectional view taken along the lines 2-2 of FIG. 1D illustrating the fused input shaft with a splined connection to the input gear which drives the intermediate gear which in turn drives the splined shaft.
Figure 3:
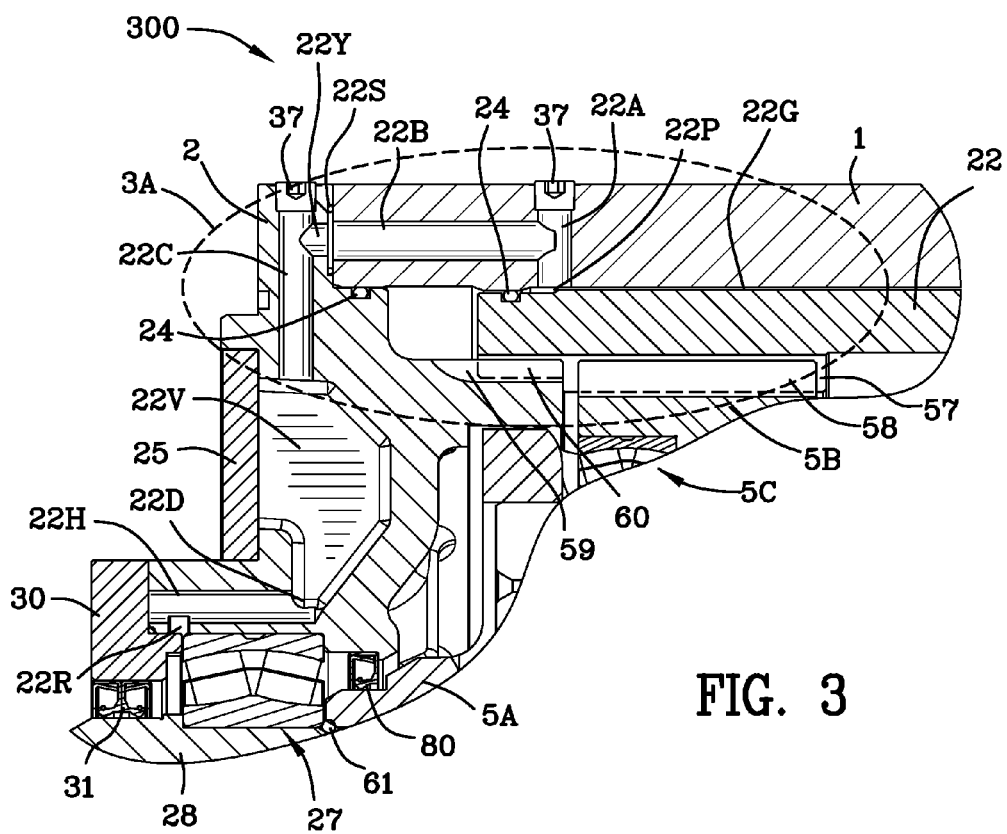
FIG. 3 is a cross-sectional view taken along the lines 3-3 of FIG. 1E illustrating the lubrication system and passageways in the ring gear, the housing, and the cover.

FIG. 1D is a right side view 100D of the gearbox 9 where power is input to the gearbox 9 via input shafts 2B. Receptacles 2R receive the input shafts 2B which are keyed. Bearing covers 10 retain bearings as illustrated in FIG. 2. Input shafts 2B include external splines 2P which mesh with internal splines 2I in receptacles 2R. FIG. 3 is a cross-sectional view taken along the lines 3-3 of FIG. 1E illustrating the input shaft 2B and the input gear 2A.

FIG. 1F is a cross-sectional view 100F taken along the lines 1F-1F of FIG. 1D illustrating the first planetary gear system, the second planetary gear system, the floating ring gear 22, the input to the first planetary gear system, and the output from the second planetary gear system 28, all of which are supported by shaft input and output spherical bearings and connected with splines enabling the gear systems and ring gear to float within the fixed housing. A pair of first spherical bearings 4C, 4C is interposed between the first planet gears 4B and the first planet shaft 4D supporting the first planet gears 4B with respect to first planet shaft 4D. A pair of second spherical bearings 5C, 5C is interposed between the second planet gears 5B and the second planet shaft 5D supporting the second planet gears 5D with respect to first planet shaft 5D. Shaft input spherical bearing 3C is interposed between tube 21 and splined shaft 3B supporting the splined shaft with respect to the tube 21. Tube 21 is affixed to adapter 13, and adapter is affixed to the housing 1. Seal 14 is an O-ring seal interposed between the adapter and the housing 1. Shaft output spherical bearing 27 is interposed between the cover 2 and the output shaft 28 supporting said output shaft with respect to the cover 2. Cover 2 is affixed to housing 1 by screws 2X shown in FIG. 1E.

Referring to FIGS. 1F and 1G, each of the pair of spherical bearings 5C includes an inner race 71, outer race 73, and rollers 72. Referring to FIGS. 1F and 1I, shaft input spherical bearing 3C includes inner race 77, outer race 79, and rollers 78. Referring to FIGS. 1F and 1H, each of the pair of spherical bearings 4C includes inner race 74, outer race 76, and rollers 75.

FIG. 1G is an enlarged portion 1000 of the cross-sectional view of FIG. 1F illustrating the floating ring gear 22, the spline connection 59, 60 between the floating ring gear 22 and the cover 2, and a portion of the lubrication system.

Referring to FIGS. 1F and 1G, cover 2 includes an external spline 59 and ring gear 22 includes an internal spline 60. External spline 59 loosely engages internal spline 60 permitting ring gear 22 to pivot with respect to external spline 59. Ring gear 22 does not rotate with respect to cover 2. However, ring gear 22 may pivot or rotate slightly as indicated by arrow 99. Gap 22G is an annular gap between the interior surface of the housing 1 and the exterior surface 22Z of the ring gear 22. The ring gear is viewable in FIGS. 3B and 3C.

Referring to FIGS. 1F and 1G, ring gear 20 includes teeth 57 which mesh with teeth 58 of the second planet gears 5B, and, ring gear 20 includes teeth 56 which mesh with teeth 55 of the first planet gears 4B. Although the teeth mesh as described, there is sufficient play between the teeth to permit the relative rotational movement between the ring gear 20 and the planet gears so as to enable ring gear 20 to pivot as indicated by reference numeral 99. The amount of pivoting or rotation of the ring gear will, of course, depend on the size of the annular gap 22G. Further, there may be relative rotational movement between the planet gears 4B, 5B and the internal ring gear 20 depending upon the dynamics and loading of the planetary gear systems within the gearbox.

FIG. 1H is an enlarged portion 100H of the cross-sectional view of FIG. 1F illustrating the spline shaft 3B input to the first sun 3E driving the first planetary gear set 4B, the first planet carrier 4A driving the second sun 20, the second sun 20 driving the second planetary gear set 5B and the second planet carrier 5A driving the floating output spindle 28, all of which are supported by shaft input and output spherical bearings 3C, 27 enabling the gear sets, carriers, suns and ring gear to float within a fixed housing 1.

Referring to FIGS. 1F and 1H, second sun 20 includes a first external gear 69 having teeth 69A and an external spline 68. External spline 68 of second sun 20 meshes with internal spline 67 of first planet carrier 4A. Teeth 69A of second sun gear 69 mesh with teeth 70 of planet gear 5B. Further, second carrier 5A includes an internal spline 66 which meshes with external spline 65 of output shaft 28. Internal spline 66 meshes with external spline 65 and there may be some relative rotational movement between the meshed splines. Although the teeth and spline mesh as described, there is sufficient play between the teeth to permit the relative rotational movement between the second sun 20, the first carrier 4A, and the second planet gears 5B so as to enable pivoting as indicated by reference numeral 99A.

Still referring to FIGS. 1F and 1H, second carrier 5A includes an internal spline 66 and output shaft 28 includes external spline 65. Internal spline 66 meshes with output spline 65. Although the spline meshes as described, there is sufficient play between and in the spline connection to permit relative rotational movement between the second sun 20, the first carrier 4A, and the second planet gears 5B so as to enable pivoting as indicated by reference numeral 99A.

FIG. 1I is an enlarged portion 100I of the cross-sectional view of FIG. 1F illustrating shaft input spherical bearing 3C interposed between the centrally located support tube 21 and the splined shaft 3B driven by the intermediate gear 3A. FIG. 1I illustrates retaining rings 3F holding first sun gear 3A in place. Shaft input spherical bearing 3C is positioned between the adaptor 13 and a shoulder on tube 21. Additionally, bearing 3C is positioned between the spline shaft 3B and the retaining rings residing partially in a groove of the splined shaft 3B. Referring to FIGS. 1F, 1H, and 1I, splined shaft 3B includes external spline 53 meshing with internal spline 54 of intermediate gear 3A. Splined shaft 3B includes external spline 51 meshing with internal spline 52 of sun 3E. Although the spline meshes as described, there is sufficient play therebetween to permit the relative rotational movement between the splined shaft 3E, first sun 3E, and intermediate gear 3A so as to enable pivoting as indicated by reference numerals 99B and 99C.

Figure 1J:
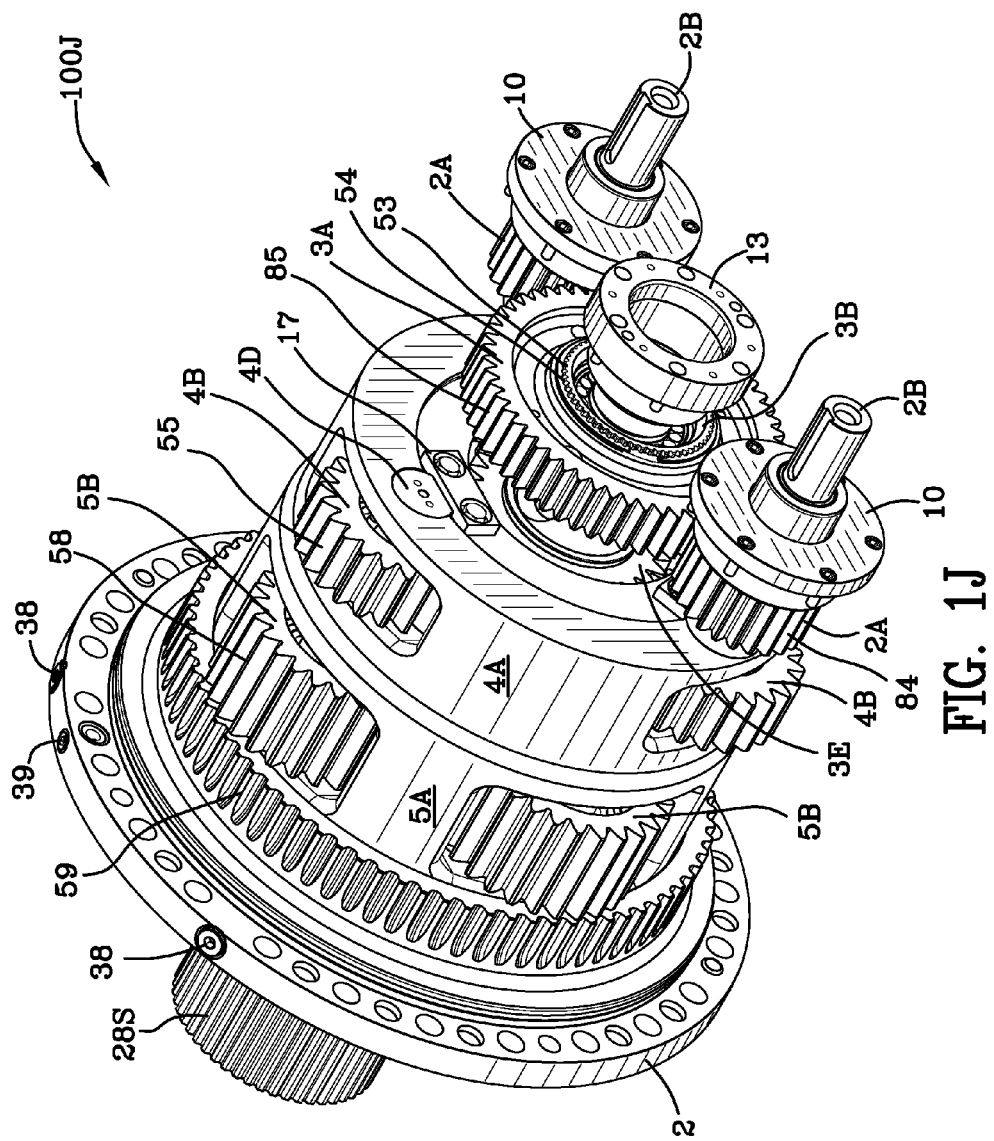
FIG. 1J is a perspective view of the floating gearbox without the ring gear and without the housing.

FIG. 1J is a perspective view 100J of the floating gearbox without the ring gear 20 and without the housing 1 shown. FIG. 1K is a perspective view 100K of the floating gearbox with the ring gear 20 shown in an exploded position and without the input gears shown. Passageway 22Z is for lubricant to flow from the interior side of the ring gear and, more specifically, from the interior teeth 56 to the outer surface 22S. There are three passageways 22P in the ring gear. Also illustrated well in FIG. 1K is the interior gear 58 of the ring gear 22 and the internal spline 60. Internal spline 60 meshes with the external spline 59 of cover 2. Cover 2 is fixed to the housing 1 and prevents rotation of the ring gear 22 with respect to cover 2 and housing 1.

Referring to FIG. 1J, the input drive shafts 2B drive input gears 2A which, in turn, drive intermediate gear 3A. Intermediate gear 3A includes an internal spline 53 meshed with spline 54 of shaft 3B such that spline shaft 3B rotates with intermediate gear 3A. Input gears 2A include teeth 84 which mesh with teeth 85 of intermediate gear 3A.

The first planetary gear system illustrated in FIGS. 1F, 1J and 1K includes a plurality of planet gears 4B, a first planet carrier 4A, and, a first sun gear 3E. Preferably there are three planet gears 4B and they are retained in place by shaft retainers 17. The second planetary gear system illustrated in FIGS. 1F, 1J and 1K includes a plurality of planet gears 5B, a second planet carrier 5A, and a second sun 20. Preferably there are four planet gears 5B and they are retained in place by shaft retainers 17. Second sun 30 is self-centering and is spaced about tube 20. Washers 20R, 20L position second sun 20 between retainer 36 and spline shaft 3B.

Figure 1L:
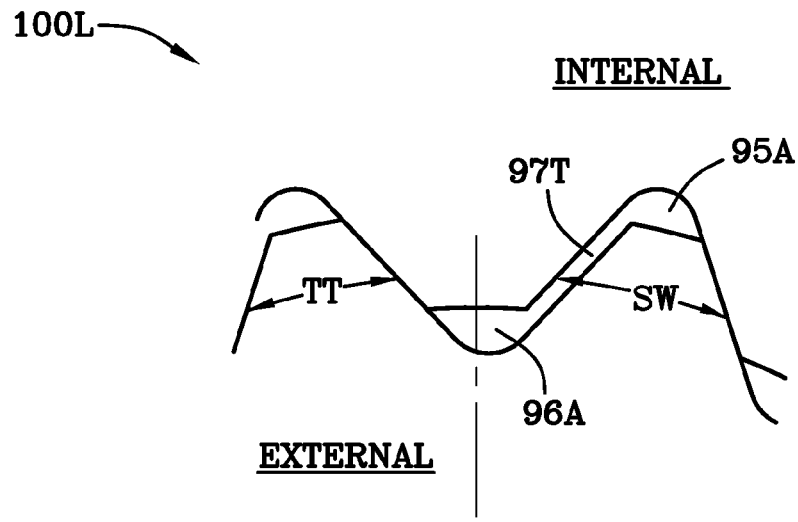
FIG. 1L is a diagrammatic view of an angular spline.

FIG. 1L is a diagrammatic view 100L of an angular internal spline and an angular external spline with vertical gaps 95A, 96A between the internal and external spline teeth. Further, FIG. 1L illustrates a horizontal gap 97A between the internal and external spline teeth. Sometimes horizontal gap 97A is called the backlash between the teeth of the mated spline. SW is the space width and TT is the tooth thickness as used in FIGS. 1L and 1M.

Figure 1M:
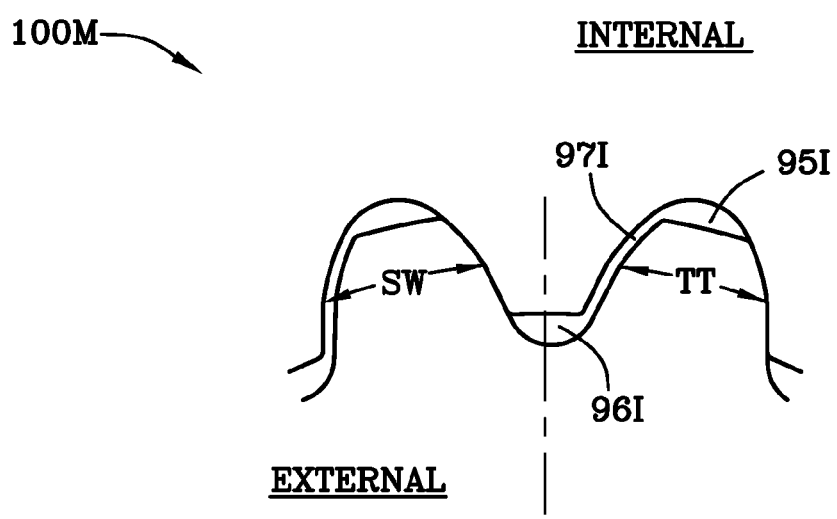
FIG. 1M is a diagrammatic view of an involute spline.

FIG. 1M is a diagrammatic view 100M similar to FIG. 1L using an involute spline tooth profile with vertical spline gaps 95I, 96I between the involute internal and external spline teeth. Further, FIG. 1M illustrates a horizontal gap 97I between the involute internal and external spline teeth. Sometimes horizontal gap 97I is called the backlash between the teeth of the mated spline.

The gaps just described and illustrated are demonstrative of all of the spline interconnections described herein and enable relative rotational movement between components. Relative rotational movement also occurs between gears. For instance, rotational movement may take place between ring gear 22 and cover 2, second planet gear 5B and ring gear 22, second planet gear 5B and second sun 20, second planet carrier 5A and output shaft 28, first planet gear 4B and ring gear 22, first planet gear 4B and first sun gear 3E, first planet carrier 4A and second sun 20, first sun gear 3E and splined shaft 3B, and, intermediate gear 3A and splined shaft 3B.

FIG. 2 is a cross-sectional view 200 taken along the lines 2-2 of FIG. 1D illustrating the fused input shaft 2B with a splined connection 2I, 2P to the input gear 2A which drives the intermediate gear 3A. Intermediate gear 3A includes an internal spline 54 which is meshed with external spine 53 of spline shaft 3B. Splined shaft 3B rotates with intermediate gear 3A.

Figure 2A:
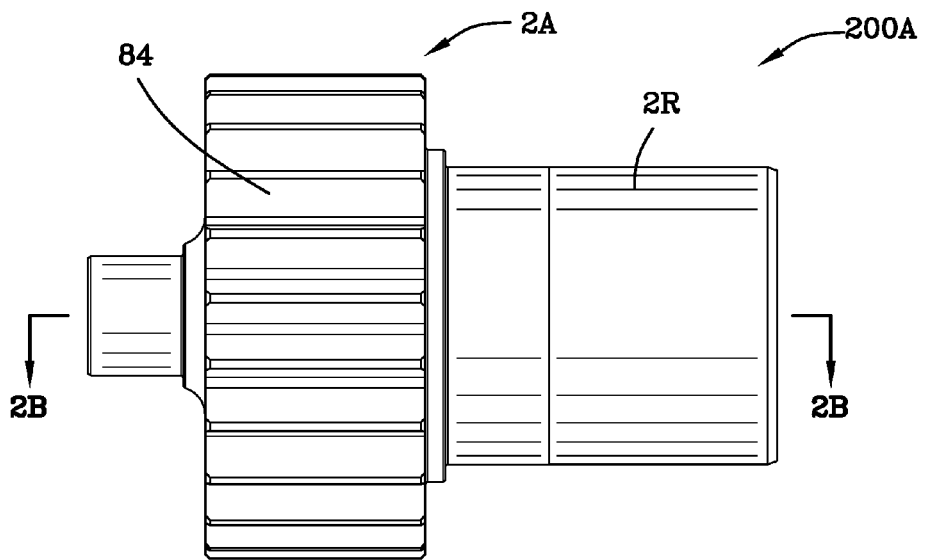
FIG. 2A is a front view of the input gear.
Figure 2B:
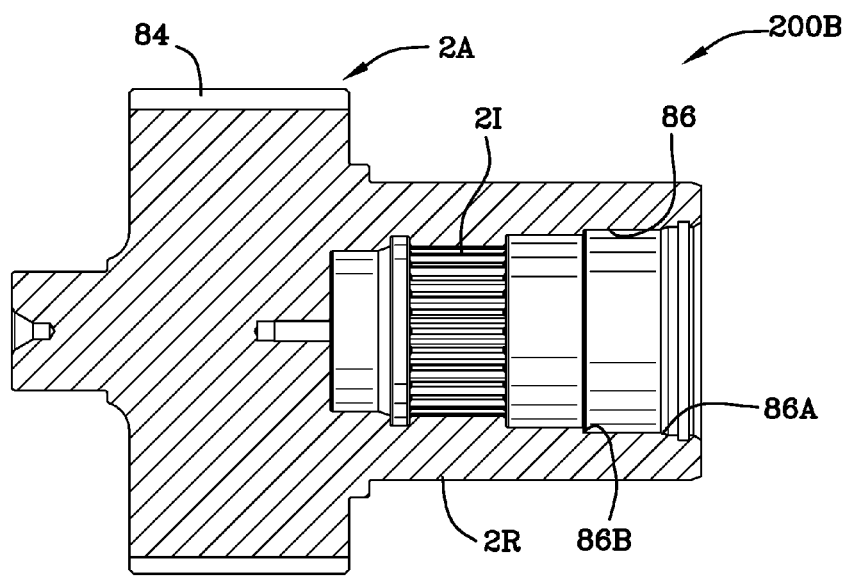
FIG. 2B is a cross-sectional view of the input gear illustrating the internal spline for connection with the fused input shaft.
Figure 2C:
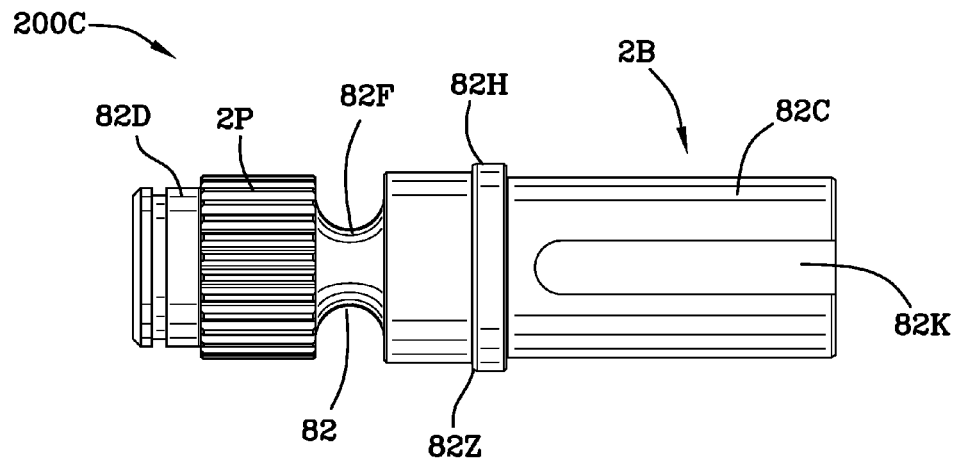
FIG. 2C is a front view of the fused input shaft.

Still referring to FIG. 2, input gear 2A is supported by cylindrical bearings 48, 49 in housing 1. Seal 40 resides between bearing cover 10 and receptacle 2R. Bearing cover 10 and input gear shoulder 48S secure cylindrical bearing 48 in place between the housing and the input gear. Housing shoulder 49S and shoulder 49B in input gear 2A secure cylindrical bearing 49 in place between the housing 1 and the input gear 2A. FIG. 2A is a front view 200A of the input gear 2A illustrating gear teeth 84 and the receptacle portion 2R. FIG. 2B is a cross-sectional view 200B of the input gear 2A illustrating the internal spline 2I for connection with the fused input shaft. FIG. 2C is a front view 200C of the fused input shaft 2B illustrating a fuse portion 82F, an external spline 2P, an outer shaft portion 82C, an inner shaft portion 82D, and a stepped bore 81 therethrough. A keyway 82K is illustrated in the shaft portion 82C. Keyway 82K mates with a corresponding key of the coupling 8 which transfers power from the electric drive motor 7 to the input shaft 2B.

Gearbox 9 has over-torque protection. Input shaft 2B includes a diametrically reduced portion 82F. The shaft thickness in the region 82R between the stepped bore 81 and the diametrically reduced portion 82F is considerably smaller than in other shaft locations 82C, 82D. O-rings 2E, 2G seal input shaft 2B against the unwanted intrusion of dirt and for the retention of grease between the seals. Should excessive force be applied to the cutter head 3, input shaft 2B functions as a fuse and fractures at the diametrically reduced portion 82F. When this fracture occurs, a portion of input shaft 2B is still connected to the coupling 8 and spins harmlessly within bushing 2C.

Input gear 2A includes a stepped bore 86 having a first shoulder 86A and a second shoulder 86B therein. Bushing 2C resides in the bore 86 of the receptacle 2R and engages second shoulder 86B therein. Input shaft 2B includes outer shoulder 82H thereon. Outer shoulder 82H of input shaft 2B engages first shoulder 86A in the bore 86 of receptacle 2R when the fuse 82F breaks. It will be noticed that outer shoulder 82H includes a chamfer 82Z which matches a corresponding surface on first shoulder 86A of bore 86 of receptacle 2R. In the normal condition without the fuse broken, outer shoulder 82H does not engage first shoulder 86A in the bore 86. Bore 81 of the input shaft 2A is a stepped bore which includes a first shoulder 81A and a second shoulder 81B.

Bushing 2C and shoulders 86A, 86B in bore 86 of receptacle portion 2R of input gear 2A prevent the diametrically reduced portion 82F (once broken) from moving inwardly toward the central portion of gear 2A preventing damage to gear 2A and/or the internal spline 2I of the receptacle portion 2R of gear 2A. Screw 2F retains the inner portion 82D of the shaft 2B within the receptacle portion 2R of input gear 2A. This over-torque protection system prevents damage occurring to ring gear 2A as well as to the other components of the gearbox. The two broken shaft portions 82C, 82D of shaft 2B are easily replaced.

To prevent damage to gear 2A while the outer fuse half is spinning, bushing 2C permits spinning to occur in a controlled fashion and thus prevents damage to the receptacle 2R of gear 2A. When fuse 82F is not broken and the gearbox is running in a normal, proper fashion, bushing 2C supports shaft 2B. Bushing 2C only functions when fuse 82F breaks or opens. If any damage occurs to the O-ring 2G when fuse 2C breaks, it can be easily replaced. The function of the O-rings 2G, 2E is to retain grease at the bushing 2C and the spline 2P.

Figure 3A:
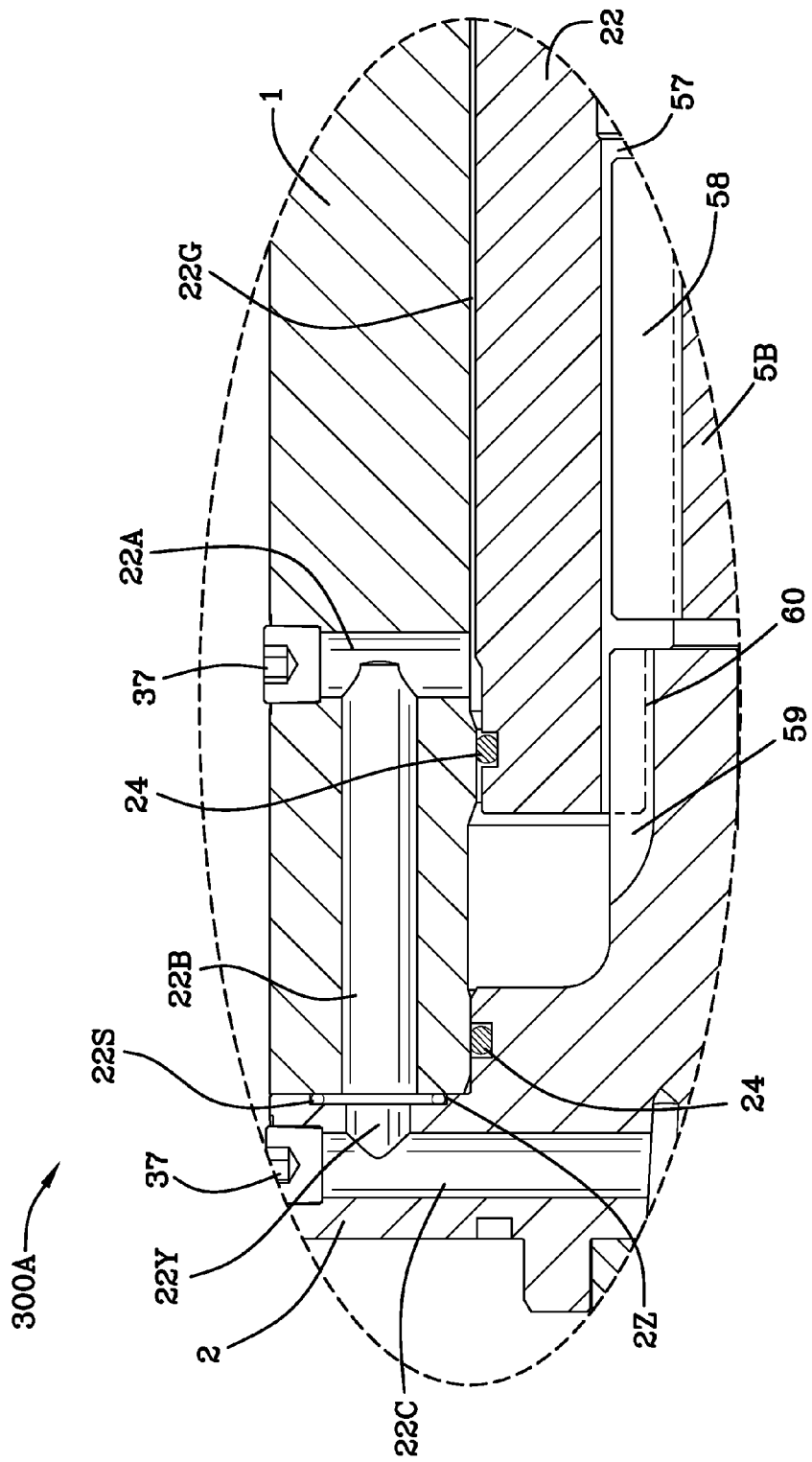
FIG. 3A an enlargement of a portion of FIG. 3 illustrating the lubricant passages through the cover and housing.

FIG. 3 is a cross-sectional view 300 taken along the lines 3-3 of FIG. 1E illustrating the lubrication system and passageways in the ring gear 22, the housing 1, and the cover 2. FIG. 3A is an enlargement 300A of a portion of FIG. 3 illustrating the lubricant passageways through the cover 2. Gap 22G is formed as an annulus between ring gear 22 and the interior surface of housing 1. The geometry of gap 22G changes with operation of the gearbox, that is, with the pivoting action of the ring gear 22 with respect to cover 2.

Figure 3B:
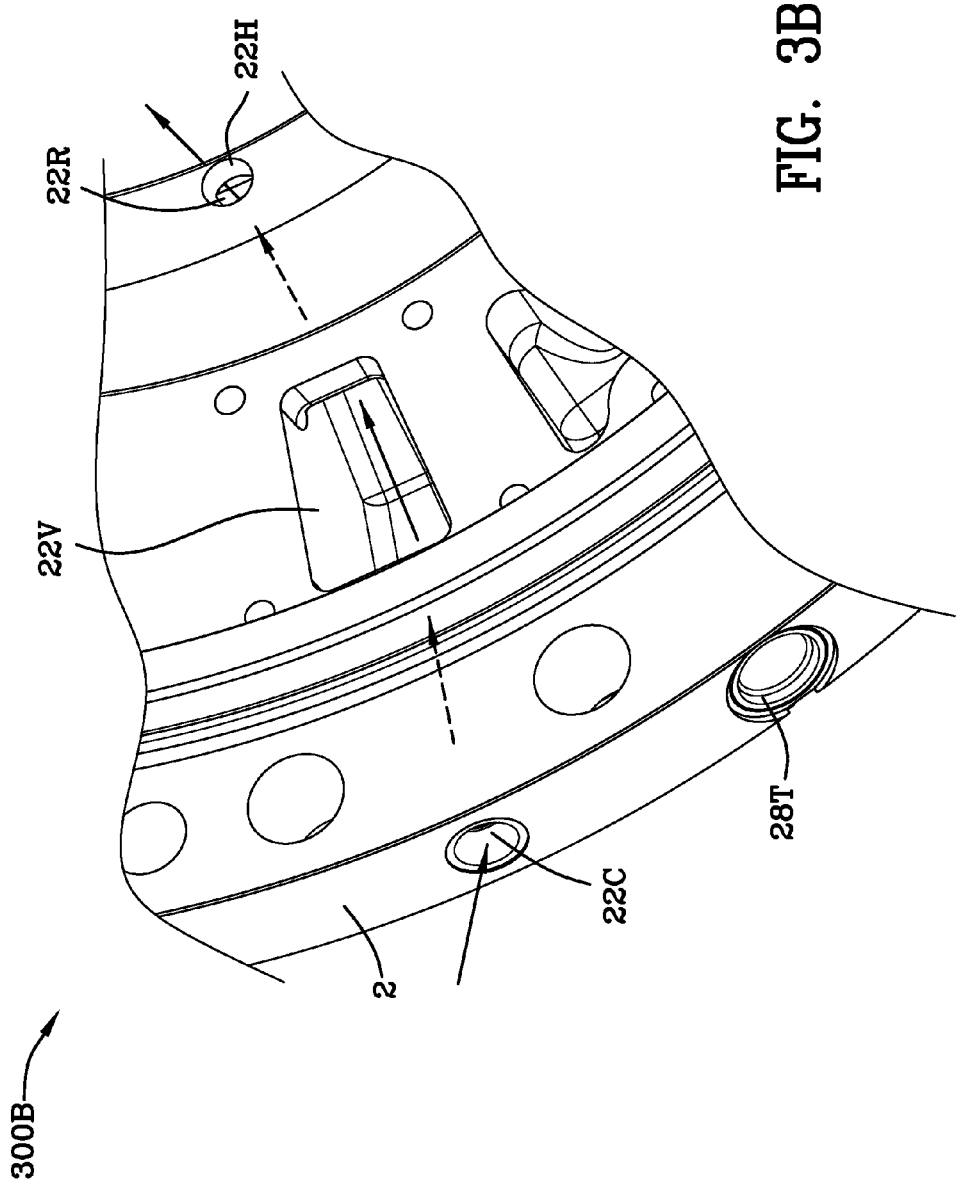
FIG. 3B is a perspective view of a portion of the cover illustrating the lubricant pathway therethrough.

FIG. 3B is a perspective view 300B of a portion of the cover 2 illustrating the lubricant pathway therethrough by the unnumbered arrows. The arrows with dashed lines indicate the lubricant flow within and through cover 2.

FIG. 3C is a plan view 300C of the floating ring gear 22 illustrating the lubricant passageway 22P therethrough. FIG. 1K illustrates 3 oil passageways 22P which are separated 120° apart meaning that at least two passageways 22P may be oriented below the oil line if the housing 1 is filled half full of lubricant. FIG. 3D is a cross-sectional view 300C of the floating ring gear 22 illustrating the lubricant passageway 22P, housing 1, and annular gap 22G between the ring gear and the housing 1. Planet gear 4B is illustrated meshed with ring gear 4B wherein pumping action of the planet gear forces lubricant into and through passageway 22P.

The cutter head 3, and thus the gearbox 9, can tilt up to a maximum of 43° 22' with respect to horizontal as illustrated by arrow 99Z in FIG. 1. The tilt in a downward arc may occur to a minor extent but it will not affect bearing lubrication When gearbox 9 is tilted up it will lifted out of the lubricant (oil). This in turn will cause the bearing to overheat, scorch, and then fail. Ring gear 22 and surrounding pieces, in addition to their normal function, function as an oil pump. In the ring gear 22, just above planet gear 4B is a small passageway between the teeth of the ring gear. As the gear teeth mesh, lubricating oil is forced up into this passageway 22P. First planet gears 4B were chosen to pump oil instead of second planet gears 5B because planet gears 4B spin much faster than second planet gears 5B and therefore make a much more effective pump. Lubricating oil then flows to and then through the annulus 22G that is between the ring gear 22 and the housing 1. O-rings 24 at each end of the ring gear keeps the lubricant under pressure from spilling out. Lubricating oil is then forced though a series of passageways of holes and cavities so that oil reaches shaft output bearing 27, and thus keeps the shaft output bearing 27 lubricated.

Referring to FIGS. 1G, 3 and 3A, lubricant is pumped by gear teeth 55 of first planetary gears 4B through passageways 22P. There are three passageways 22P spaced 120° apart as illustrated in FIG. 1K. The lubricant exits passageways 22P supplying a volume as defined by generally annularly shaped gap 22G and O-rings 24, 24 as illustrated in FIG. 1G. When the oil is in the volume as defined it is under pressure and it enters vertical passageway 22A in housing 1 which, in turn, communicates with horizontal passageway 22B in housing 1. Seal 22S resides in a recess 2Z in cover 2. Recess 2Z is aligned with passageway 22B in the housing and communicates, horizontally, with a short passageway 2Y in cover 2 which, in turn, communicates with a vertical passageway 22C in cover 2. Vertical passageway 22C communicates with volume 22V which is enclosed by front cooler plate 25. Cooler plate 25 is affixed to cover 2 with screws 11. As lubricant collects and resides in volume 22V, it passes into and through necked-down area 22D where it is communicated to horizontal passageway 22H. Horizontal passageway 22H communicates opening 22R which provides lubricant to shaft output spherical bearing 27. Lubrication is provided despite the orientation of the gearbox, in other words, if the gear box in inclined, lubrication will continue by virtue of the just-described pumping system.

Figure 4A:
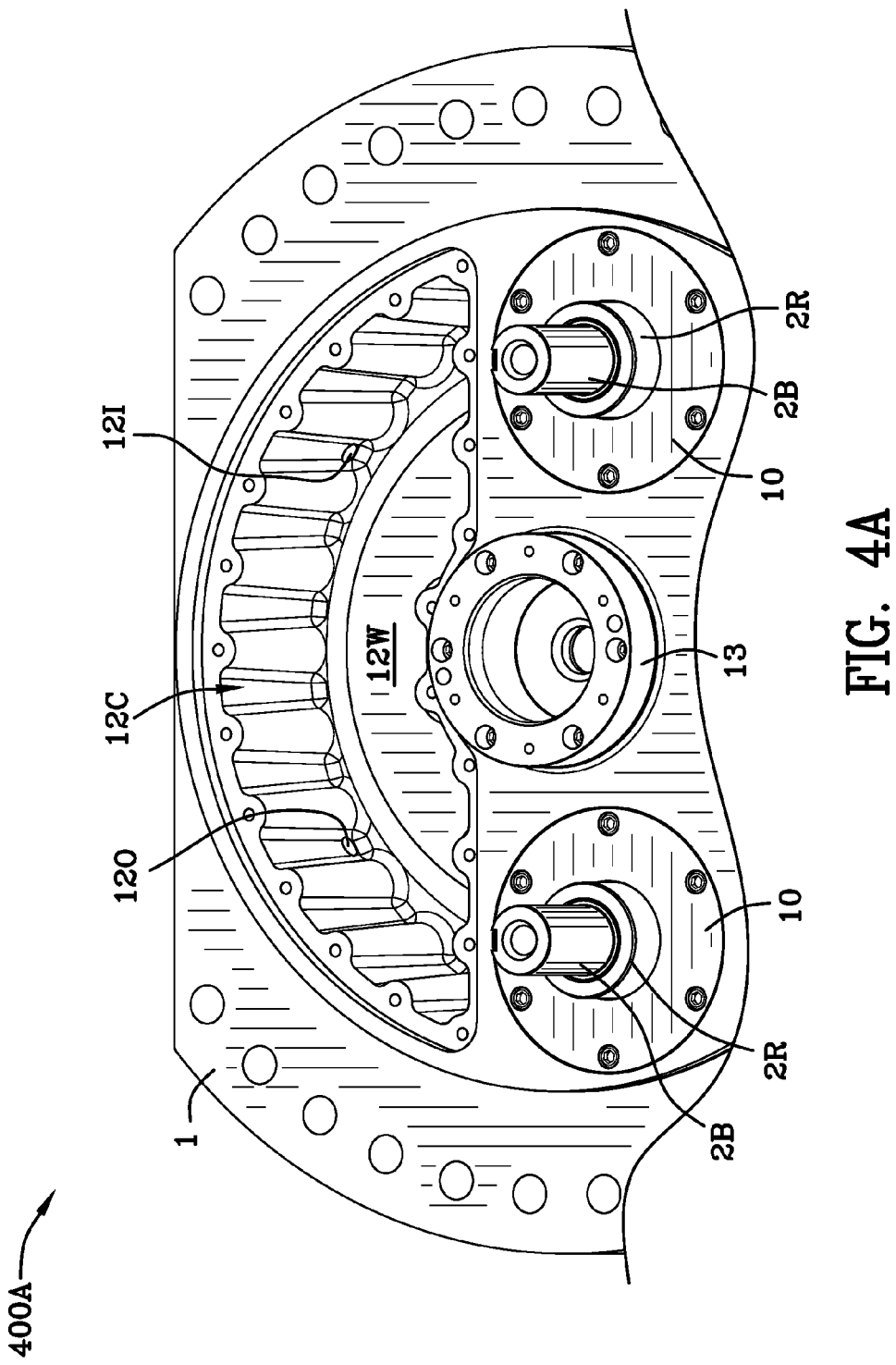
FIG. 4A is a right end view of the gearbox with the cooling water plate removed illustrating the water cavity, the water inlet, the water outlet, and a wall separating the water cavity from the gear systems.
Figure 4B:
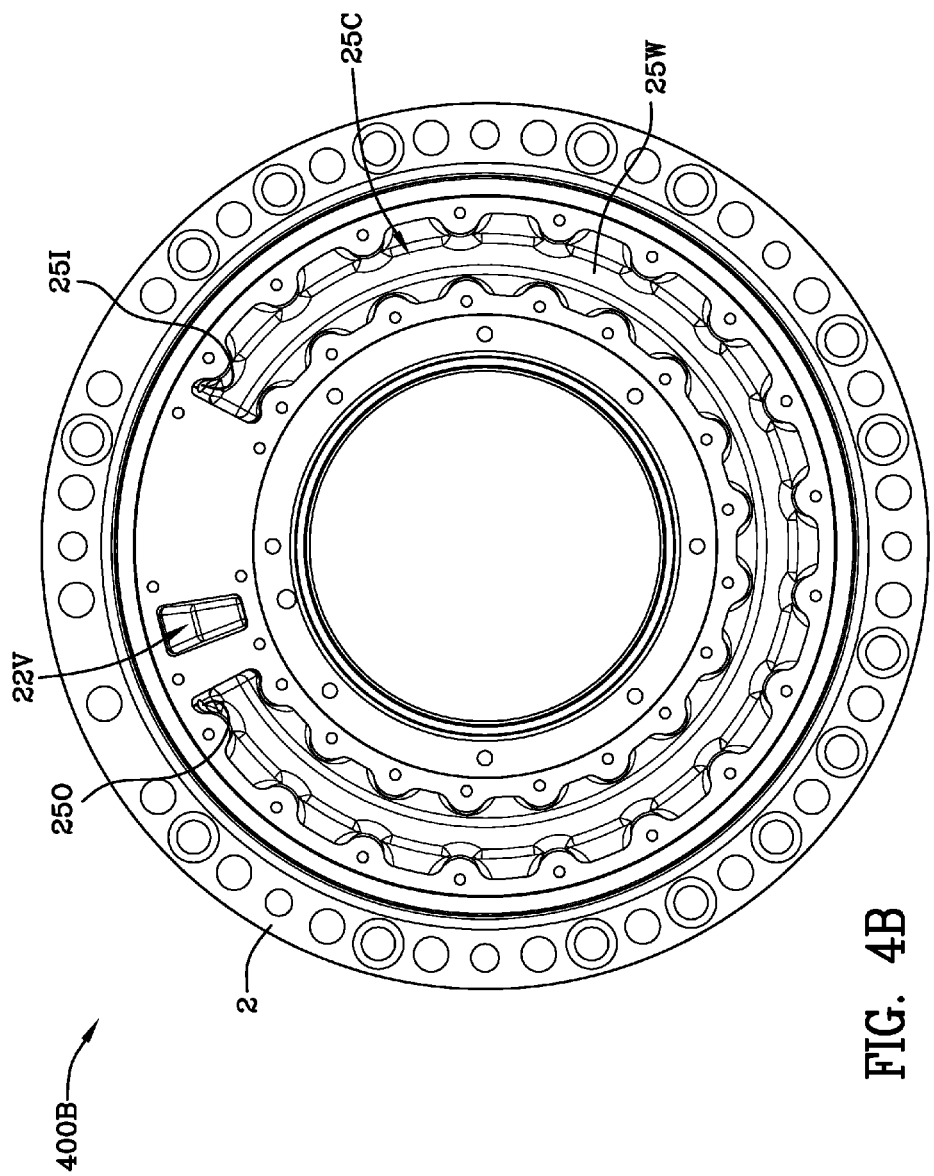
FIG. 4B is the left end view of the gearbox with the cooling water plate removed illustrating the water cavity, the water inlet, the water outlet, and a wall separating the water cavity from the gear systems.

Referring to FIGS. 4, 4A and 4B, a gearbox, comprising a housing and a floating gear means for protecting a gear mechanism from damage due to axial and radial forces applied to the gearbox is disclosed. A first cooling compartment and a second cooling compartment are disclosed. The first and second cooling compartments are isolated from the floating gear means. First and second ports supply cooling fluid to the first compartment, and, the third and fourth ports supplying cooling fluid to the second compartment. The ports are all identified with the reference numeral 38 in FIG. 4.

It is not possible for cooling water to leak into the gearbox as the gearboxes are sealed with respect to the cooling compartments. Water in the cooling cavities/compartments 12C, 25C is isolated from the gearbox by a thick, heat conductible, wall of steel 12W, 25W, respectively. Cooling cavities/compartments 12C, 25C exist at each end of the gearbox, behind the rear plate 12 and the front plate 25.

FIG. 4 is a top view 400 of the gearbox 9 illustrating cooling water plugs 38, 38 for the supply of cooling water at the ends of the gearbox. FIG. 4 also illustrates the input shafts 2B, 2B, cover plate 12, cover plate 25, and the output shaft spline 28S. FIG. 4A is the right end view 400A of the gearbox with the cooling water plate removed illustrating the water cavity 12C, the water inlet 12I, the water outlet 12O, and the wall 12W separating the water cavity 12C from the gear systems. Wall 12W is highly thermally conductive. FIG. 4B is the left end view 400B of the gearbox 9 with the cooling water plate 25 removed illustrating the water cavity 25C, the water inlet 25I, the water outlet 25O, and a wall 25W separating the water cavity 25C from the gear systems. Wall 25W is also highly thermally conductive. Large amounts of power flow through the gearbox and heat is generated through friction of the gear systems. Referring to FIG. 4, plugs 37, 37 are illustrated sealing the oil lubrication drill holes created in the manufacturing process. Plugs 37, 37 are also illustrated in FIGS. 3 and 3A.

Cooling cavities 12C, 25C exist at each end of the gearbox, behind plate 12 and plate 25, respectively. A portion of cavity 25C is viewable in FIG. 1F. FIG. 4 is a top view 400 of gearbox 9. Plugs 38 are illustrated and they are removed from threaded holes, and hoses are attached to those holes in order that cooling water be pumped into the cavities. The cooling water within the cavities 12C, 25C removes heat generated in the gearbox. Cavities 12C, 25C are completely sealed from the gear systems which reside behind walls 12W, 25W, respectively.

There is a water conduit that passes through the central portion of the gearbox. When the gearbox is installed in an earth-boring machine, the water conduit 6C carrying cooling fluid is installed which passes through this tube and feeds water to the cutter head. In FIGS. 1 and 1A, reference numeral 6C is used to denote the water conduit 6C through the gearbox 9 and the cutter head 3. Water conduit 6C resides within tube 21 as illustrated in FIG. 1F.

REFERENCE NUMERALS

1—housing
2—cover
2A—input gear
2B—input shaft
2C—cylindrical bushing
2E, 2G, 14, 24—O-ring
2F—screw/connector affixing input shaft 2b to input gear 2A
2I—internal spline of input gear 2A
2P—external spline of input shaft 2B
2R—receptacle for input shaft 2B
2S—shoulder for retaining bearing
2X—plurality of screws affixing cover 2 to housing 1
2Z—recess in cover in which seal 22S resides
3—cutter head
3A—intermediate gear
3B—splined shaft
3C—shaft input spherical bearing between tube 21 and shaft 3B
3E—sun gear
3F—retaining ring
4—horizontal force acting on the cutter head 3
4A—first planet carrier
4B—first planet gears
4C—first pair of spherical bearings between first planet shaft 4D and first planet gear 4B
4D—first planet shafts
5—vertical force acting on the cutter head 3
5A—second planet carrier
5B—second planet gears
5C—second pair of spherical bearings
5D—second planet shafts
6—drive shaft
6A—coupling frame
6B—coupling
6C—water conduit for cooling and lubricating cutting head
7—electric motor, prime mover, one of two
7A—motor frame
7R—roadheader assembly
8—coupling between motor and input gear
9—gearbox
10—bearing cover
11—headed screw
12—rear cooler plate/cap
12S—connector for cooler plate/cap 12
13—adapter
13A—connector/screw
17—planet shaft retainer
20—second sun having a gear and an external spline
21—tube
22—ring gear
22B—horizontal passageway in housing 1
22C—vertical passageway in cover 2
22D—necked down area in cover 2
22G—gap between ring gear 22 and housing 1
22H—horizontal passageway in cover 2 in communication with opening 22r
22P—port leading to vertical passageway 22A
22R—opening in cover 2 providing lubricant to shaft output spherical bearing 27
22V—volume in cover 2 in which lubricant resides
22Y—short horizontal passageway in cover 2
22Z—exterior surface of ring gear 22
24R—recess for O-ring
25—front cooler plate/cap
26—dowel pin
27—shaft output spherical bearing
27I—inner race
27O—outer race
27R—rollers
28—output shaft
28L—shoulder on shaft 28
28S—spline on the output shaft
30—bearing cover
30S—connector/screw
31—lip seal
33—lip seal
34, 48, 49—bearing
36—retainer
37—plug in housing
38—port plug in housing which is removed for cooling water connections
38T—threaded connection for cooling water 39—port plug in housing for the addition of oil to the gearbox 9
40—seal
41—dowel pins aligning cover 2 with respect to housing 1
48B—shoulder
48S—input gear shoulder
49S—housing shoulder
51—external spline of spline shaft 3b meshing with spline 52 of first sun 3E
52—internal spline of first sun 3E
53—external spline meshing with internal spline 54 of intermediate gear 3A
54—internal spline of intermediate gear 3A
55—first planet gear teeth
56—internal ring gear mating with planet gear teeth 55 of first planet gear 4B
57—internal ring gear mating with planet teeth 58 of second planet gear 5B
58—second planet gear teeth
59—external spline of the cover 2
60—internal spline of the ring gear 20
61—retaining ring which retains output shaft 28
65—external spline of output shaft 28
66—internal spline of second planet carrier 5A
67—internal spline of first planet carrier 4A
68—external spline of second sun 20
69—external gear of second sun 20
69A—output teeth of the second sun 20
70—teeth of second planet gear 5B
71—inner race of spherical bearing 5C
72—roller bearings of spherical bearing 5C
73—outer race of spherical bearing 5C
74—inner race of spherical bearing 4C
75—roller of spherical bearing 4C
76—outer race of spherical bearing 4C
77—inner race of shaft input spherical bearing 3C
78—roller of shaft input spherical bearing 3C
79—outer race of shaft input spherical bearing 3C
80—shaft seal between second carrier 5A and cover 2
81—stepped bore in input shaft 2B
81A—first shoulder in bore of input shaft 2B
81B—second shoulder in bore of input shaft 2B
82C—outer portion of the input shaft 2B
82D—inner portion of the input shaft 2B
82H—outer shoulder on input shaft 2A
82F—annular groove, fused portion
82R—thin section between annular groove and the stepped bore 81 in input shaft 2B
82Z—chamfer on shoulder 82H
84—teeth of input gear 2A
85—teeth of intermediate gear 3A
86—bore in receptacle portion 2R of input gear 2A
86A—first shoulder in bore 86 engaging shoulder 82H of input shaft 2B
86B—second shoulder in bore 85 engaging bushing 2C
95A—gap between internal angular spline and external angular spline
96A—gap between internal angular spline and external angular spline
97A—gap, backlash, between internal angular spline and external angular spline
95I—gap between internal involute spline and external involute spline
96I—gap between internal involute spline and external involute spline
97I—gap, backlash, between internal involute spline and external involute spline
99—arrow indicating relative rotation of ring gear 22, housing 1, and second planet gears 5B
99A—arrow indicating relative rotation of second planet gear 5B and second sun 20
99B—arrow indicating relative rotation of first sun gear 3E and splined shaft 3B
99C—arrow indicating relative rotation of intermediate gear 3A and spline shaft 3B
99D—arrow indicating relative rotation of second carrier 5A and output shaft 28
99E—arrow indicating relative rotation of first planet gear 4B, ring gear 20 and housing 1
99Z—arrow indicating rotation of the roadheader
100—schematic view of a roadheader including the cutter head, gearbox and prime mover
100A—enlarged portion of the schematic view of FIG. 1 illustrating the cutter head and gearbox
100B—perspective view of the gearbox
100C—front view of the gearbox
100D—right side view of the gearbox where power is input to the gearbox
100E—left side view of the gearbox where power is output from the gearbox.
100F—cross-sectional view taken along the lines 1F-1F of FIG. 1D illustrating the first planetary gear system, the second planetary gear system, the floating ring gear, the input to the first planetary gear system, and the output from the second planetary gear system, all of which are supported by shaft input and output spherical bearings enabling the gear systems and ring gear to float within a fixed housing
100G—enlarged portion of the cross-sectional view of FIG. 1F illustrating the floating ring gear, the spline connection between the floating ring gear and the cover, and a portion of the lubrication system
100H—enlarged portion of the cross-sectional view of FIG. 1F illustrating the spline input to the first sun driving the first planetary gear set, the first planet carrier driving the second sun, the second sun driving the second planetary gear set and the second planet carrier driving the output spindle, all of which are supported by the shaft input and output spherical bearings enabling the gear systems and ring gear to float within a fixed housing
100I—enlarged portion of the cross-sectional view of FIG. 1F illustrating a shaft input spherical bearing interposed between the centrally located support tube and the splined shaft driven by the intermediate gear
100J—perspective view of the floating gearbox without the ring gear and without the housing
100K—perspective view of the floating gearbox with the ring gear shown in an exploded position
100L—diagrammatic view of an angular spline
100M—diagrammatic view of an involute spline
200—cross-sectional view taken along the lines 2-2 of FIG. 1D illustrating the fused input shaft with a splined connection to the input gear which drives the intermediate gear which in turn drives the splined shaft
200A—a front view of the input gear
200B—cross-sectional view of the input gear illustrating the internal spline for connection with the fused input shaft
200C—front view of the fused input shaft
300—cross-section taken along the lines 3-3 of FIG. 1E illustrating the lubrication system and passageways in the ring gear, the housing, and the cover
300A—enlargement of a portion of FIG. 3 illustrating the lubricant passages through the cover and housing.

300B—perspective view of a portion of the cover illustrating the lubricant passages through the cover
300C—plan view of the floating ring gear illustrating the lubricant passageway therethrough
300D—cross-sectional view of the floating ring gear illustrating the lubricant passageway therethrough
400—top view of the gearbox illustrating cooling water plugs
400A—right end view of the gearbox with the cooling water plate removed illustrating the water cavity, the water inlet, the water outlet, and a wall separating the water cavity from the gear systems
400B—left end view of the gearbox with the cooling water plate removed illustrating the water cavity, the water inlet, the water outlet, and a wall separating the water cavity from the gear systems
TT—tooth thickness
SW—space width The invention has been set forth by way of example only and those skilled in the art will recognize that changes may be made to the examples provided herein without departing from the spirit and the scope of the appended claims.

The invention claimed is:

1. An overload protection device in combination with a prime mover and gearbox transmission supplying torque through said gearbox transmission to a load, comprising:
    an input shaft;
    said input shaft includes a bore therethrough;
    said input shaft includes an external spline;
    said prime mover transmitting torque to said input shaft;
    said gearbox transmission includes an input gear;
    said input gear includes a bore therein;
    said bore of said input gear includes an internal spline;
    said input shaft includes a weakened region;
    said input gear of said gearbox transmission drives a planetary gear system which, in turn, supplies power to said load; and,
    upon overload of said gearbox transmission, said input shaft breaks at said weakened region.

2. An overload protection device in combination with a prime mover and gearbox transmission supplying torque through said gearbox transmission to a load, as claimed in claim 1, wherein said weakened region is U-shaped in cross-section.

3. An overload protection device in combination with a prime mover and gearbox transmission supplying torque through said gearbox transmission to a load, as claimed in claim 1, wherein said weakened region is thin in cross-section.

4. An overload protection device in combination with a prime mover and gearbox transmission supplying torque through said gearbox transmission to a load, comprising:
    an input shaft;
    said input shaft includes a bore therethrough;
    said input shaft driven by said prime mover and for rotation therewith;
    said input shaft includes an external spline and an outer shoulder;
    said prime mover transmitting torque to said input shaft;
    said gearbox transmission includes an input gear;
    said input gear includes a receptacle portion, said receptacle portion includes a bore therein;
    said bore of said receptacle portion of said input gear includes an internal spline, said bore of said receptacle portion of said input gear includes a first shoulder therein;
    said input shaft includes an annular groove;
    said input gear of said gearbox transmission drives a planetary gear system which, in turn, supplies power to said load; and,
    upon overload of said gearbox transmission, said input shaft fractures said annular groove and said first shoulder of said receptacle portion of said input gear engages said outer shoulder of said input shaft preventing said annular groove, once fractured, from moving inwardly toward said input gear preventing damage to said input gear.

5. An overload protection device in combination with a prime mover and gearbox transmission supplying torque through said gearbox transmission to a load, as claimed in claim 4, wherein said annular groove is U-shaped in cross-section.

6. An overload protection device in combination with a prime mover and gearbox transmission supplying torque through said gearbox transmission to a load, as claimed in claim 4, further comprising:
    said bore of said receptacle portion includes a first groove and a second groove;
    a first seal resides in said first groove and seals against said input shaft; and,
    a second seal resides in said second groove and seals against said input shaft.

7. An overload protection device in combination with a prime mover and gearbox transmission supplying torque through said gearbox transmission to a load, as claimed in claim 6, further comprising:
    said first seal and said second seal straddle said annular groove and maintain lubricant between said first and second seals and between said input shaft and said bore of said receptacle portion of said input gear.

8. An overload protection device in combination with a prime mover and gearbox transmission supplying torque through said gearbox transmission to a load, comprising:
    an input shaft;
    said prime mover transmitting torque to said input shaft;
    said gearbox transmission includes an input gear;
    said input shaft affixed to said input gear;
    said input shaft includes an annular groove;
    said input gear includes a bore therein;
    said bore of said input gear includes an internal spline;
    said input shaft includes a bore therethrough;
    said input shaft includes an external spline; and,
said external spline of said input shaft engages said internal spline of said input gear;
    said input gear of said gearbox transmission drives a planetary gear system which, in turn, supplies power to said load; and,
    upon overload of said gearbox transmission, said input shaft breaks at said annular groove.

* * * * *

UNITED STATES PATENT AND TRADEMARK OFFICE
CERTIFICATE OF CORRECTION

| | |
|---|---|
| PATENT NO. | : 9,353,800 B2 |
| APPLICATION NO. | : 14/325021 |
| DATED | : May 31, 2016 |
| INVENTOR(S) | : Kenneth E. Carlton et al. |

It is certified that error appears in the above-identified patent and that said Letters Patent is hereby corrected as shown below:

In the specification,

Col. 10, line 59, after "portion" delete "1000" and insert --100G-- therefor.

Signed and Sealed this
Second Day of August, 2016

Michelle K. Lee
*Director of the United States Patent and Trademark Office*